(12) United States Patent
Isaac et al.

(10) Patent No.: US 8,206,047 B1
(45) Date of Patent: Jun. 26, 2012

(54) KEYBOARD OVERLAY FOR OPTIMAL TOUCH TYPING ON A PROXIMITY-BASED TOUCH SCREEN

(75) Inventors: Steven Alfred Isaac, Redmond, WA (US); Bradley S. Melmon, Seattle, WA (US); Ralph Levy, Doylestown, PA (US)

(73) Assignee: TouchFire, Inc., Redmond, WA (US)

( * ) Notice: Subject to any disclaimer, the term of this patent is extended or adjusted under 35 U.S.C. 154(b) by 0 days.

(21) Appl. No.: 13/168,888

(22) Filed: Jun. 24, 2011

(51) Int. Cl.
*G06F 3/02* (2006.01)
(52) U.S. Cl. ......... 400/491; 400/472; 400/490; 400/714
(58) Field of Classification Search .................. 400/472, 400/490, 491, 714
See application file for complete search history.

(56) References Cited

U.S. PATENT DOCUMENTS

| | | | |
|---|---|---|---|
| 4,529,849 A | 7/1985 | Kamei et al. | |
| 4,762,436 A * | 8/1988 | Herzog et al. ............. | 400/491.3 |
| 5,389,757 A | 2/1995 | Souliere | |
| 5,572,573 A | 11/1996 | Sylvan et al. | |
| 5,612,692 A | 3/1997 | Dugas et al. | |
| 5,687,995 A | 3/1999 | Holehan | |
| 5,909,211 A | 6/1999 | Combs et al. | |
| 6,259,044 B1 * | 7/2001 | Paratore et al. ............... | 200/5 A |
| 6,492,978 B1 * | 12/2002 | Selig et al. .................... | 345/173 |
| 6,667,738 B2 | 12/2003 | Murphy | |
| 6,776,546 B2 | 8/2004 | Kraus et al. | |
| 6,791,480 B1 * | 9/2004 | Uke ................................ | 341/34 |
| 6,680,998 B1 | 4/2005 | Kraus et al. | |
| 6,996,426 B2 | 2/2006 | Granberg | |
| 7,412,258 B1 * | 8/2008 | Lipponen et al. .......... | 455/556.1 |
| 7,479,949 B2 | 1/2009 | Jobs et al. | |
| 7,602,378 B2 | 10/2009 | Kocienda et al. | |
| 7,614,008 B2 | 11/2009 | Ording | |
| 7,659,885 B2 | 2/2010 | Kraus et al. | |
| 7,663,607 B2 | 2/2010 | Hotelling et al. | |
| 7,812,828 B2 | 10/2010 | Westerman et al. | |
| 7,844,914 B2 | 11/2010 | Andre et al. | |
| 7,941,760 B2 | 5/2011 | Kocienda | |
| 2003/0235452 A1 | 12/2003 | Kraus et al. | |
| 2007/0013662 A1 | 1/2007 | Fauth | |

(Continued)

FOREIGN PATENT DOCUMENTS

GB 1996-2313343 11/1997

(Continued)

OTHER PUBLICATIONS

John Brownlee, The iKeyboard Tries to Bring Touch Typing to the iPad, May 11, 2011, Cult of Mac, http://www.cultofmac.com/94535/the-ikeyboard-tries-to-bring-touch-typing-to-the-ipad/.

*Primary Examiner* — Daniel J Colilla
(74) *Attorney, Agent, or Firm* — Foster Pepper PLLC; Joel B. Ard

(57) ABSTRACT

A keyboard overlay for use on a touch screen is disclosed, as well as novel key structures for use on overlays. The keyboard overlay and key structures have novel structures which can provide finger resting resistance, deceleration during actuation, pre-actuation cues, finger positioning cues, key identification cues, and other desired aspects of a keyboard optimized for touch typing. Methods for stowing and deploying the keyboard overlay to align with the virtual keyboard of a touch screen are also disclosed. The disclosed keyboard overlay can provide optimal touch typing characteristics for use on all known types of touch screens.

31 Claims, 28 Drawing Sheets

U.S. PATENT DOCUMENTS

| | | |
|---|---|---|
| 2008/0030476 A1* | 2/2008 | Raj V.A. .................... 345/173 |
| 2008/0282873 A1* | 11/2008 | Kotton et al. ................ 84/645 |
| 2009/0148219 A1 | 6/2009 | Odell et al. |
| 2010/0238119 A1* | 9/2010 | Dubrovsky et al. ......... 345/169 |
| 2010/0302168 A1 | 12/2010 | Giancarlo et al. |
| 2011/0143835 A1* | 6/2011 | Sizelove ...................... 463/31 |
| 2011/0157037 A1* | 6/2011 | Shamir et al. .............. 345/173 |
| 2011/0241999 A1* | 10/2011 | Thier ........................... 345/168 |
| 2011/0316785 A1* | 12/2011 | Hidary ......................... 345/168 |
| 2012/0050165 A1* | 3/2012 | Kim et al. .................... 345/168 |

FOREIGN PATENT DOCUMENTS

| | | | |
|---|---|---|---|
| JP | 2011113248 A | * | 6/2011 |
| WO | WO 2010082196 A2 | * | 7/2010 |

* cited by examiner

KEYBOARD OVERLAY FOR OPTIMAL TOUCH TYPING ON A PROXIMITY-BASED TOUCH SCREEN

FIELD OF THE INVENTION

This invention relates to keyboards, and more specifically to keyboard overlays for touch screen virtual keyboards which are designed to be optimized for touch typing.

BACKGROUND OF THE INVENTION

Typing on a keyboard is the most common and efficient way for a user to enter data into a computer system. For this reason, computers of all sizes use a form of alphanumeric keyboard to allow a user to enter data. As ever more powerful computers are compressed into smaller sizes, keyboard technology has changed. Examples abound, such as the miniaturized keyboard of the BLACKBERRY® handheld, and the virtual keyboard which users can call up on an iPAD® tablet computer.

These and other keyboards for small computers, especially keyboards associated with mobile computers and most especially those on tablet computers and other computers with touch-screen technology, are less effective than traditional computer keyboards because they are not optimized for touch typing.

Touch typing as we know it today was invented around 1888, yet is still the fastest and most accurate way of entering data into a computer system. A touch typist memorizes the location of the keys on the keyboard and uses muscle memory instead of sight to type. Touch typing can be performed while typists focus vision and attention on things other than the keyboard.

The touch typist places eight fingers on specific keys in the home row, rests them there when not typing, and returns to them while typing in order to re-orient their fingers. These keys are referred to as the home row rest keys. On a standard QWERTY keyboard, these are "ASDF" for the four left fingers and "JKL;" for the right four fingers. The typist actuates a home row rest key by striking the key in a generally vertical direction.

For the sake of clarity a North/South, East/West orientation reference system is used in this document. The northern most alpha row of a QWERTY virtual keyboard is designated row 1 and at least contains the letter keys "Q", "W", "E", "R", "T", "Y", "U", "I", "O", "P." Row 2, the next row south of row 1 is also referred to as the "home row" and contains at least the letters "A", "S", "D", "F", "G", "H", "J", "K" and "L." Row 3, the next row south, contains at least the letters "Z", "X", "C", "V", "B", "N", and "M." Row 4 is also referred to as the "space-bar row." The directions "vertical", "straight up", "straight down", or "normal" are used synonymously and interchangeably to describe trajectories essentially perpendicular to a plane defined by the entire keyboard layout, or in the case of digital tablets, approximately perpendicular to the glass touch-screen. Note that this is simply a labeling mechanism—the present invention is not dependent on the keyboard layout on the underlying virtual keyboard. It functions identically for a QWERTY, AZERTY, Dvorak, numeric, split keyboard, or any other keyboard layout used for touch typing.

A touch typist strikes the other keys on the keyboard at many different lateral angular trajectories in addition to straight down. All of the possible finger trajectories that occur in touch typing are referred to as the touch typing finger trajectories. After striking the key, the finger then returns to its place on the home row. The typist's thumbs hover over the space bar and strike it vertically. Touch typists can actuate multiple keys in parallel (that is, press down on one key while one or more other previously actuated keys are still depressed). The requirement for a keyboard to allow, recognize and distinguish among multiple nearly simultaneous keystrokes is referred to as "n-key rollover." Thus, a keyboard design that allows the system to distinguish a second key stroke while one other previously actuated key is still depressed has "2-key rollover," and a keyboard design that allows the system to distinguish between one key while two other previously actuated keys are still depressed has "3-key rollover."

An optimal keyboard design for the vast majority of typists has 4-key rollover, allowing the system to account for and recognize a fourth key being depressed while two other previously actuated letter keys plus the SHIFT key are still depressed.

The touch typist automatically re-aligns his or her fingers to proper placement on the keyboard (also referred to as finger alignment) through subtle tactile cues gained while typing, such as the outer edges of the key tops on all rows or small nubs over the home row keys that the index fingers rest on (typically the "F" and "J" keys of a standard QWERTY keyboard). Some keyboards have spherical or cylindrically concave or convex surfaces on the top surfaces of each key top that also provide tactile finger alignment feedback.

People who have not learned to touch type typically use a "hunt and peck" method of typing that is performed with two or more fingers. As the name implies, the typist simply hovers his or her fingers over the entire keyboard and strikes keys as needed. Since the "hunt and peck" typist moves the finger directly over a key before striking it, most key presses are approximately straight down. "Hunt and peck" typists must keep sight and attention focused on the keyboard. They must actively support the weight of their fingers during the periods they are hovering.

In general, touch typing is significantly faster and more accurate than "hunt and peck" typing, because the touch typist's fingers travel shorter distances to key actuation, and the touch typist uses many more fingers simultaneously or in quick sequence. Effective touch typists can focus attention on sources other than the keyboard while typing. In fact, the act of consciously thinking about each key and possibly looking for it slows many typists down and can even adversely affect typing accuracy.

Keyboards for touch typing must be large enough to allow the typist to place eight fingers on the home row, with four fingers of each hand located on keys immediately adjacent to each other. For the majority of the adult population, this requires a keyboard with a lateral key pitch (East/West distance from the center of one key to the center of the adjacent key) of 19-19.5 mm. Keyboards with smaller key pitches become increasingly more difficult to use for touch typing the smaller the pitch becomes. Typing speed goes down and error rates go up as the pitch gets smaller.

The home row rest keys must provide enough resistive force (vertical support) to allow the typist to comfortably rest his or her fingers on these keys. This requires approximately 10 g-20 g of resistive force. At the same time, these keys must be responsive enough to be easily actuated when the typist consciously decides to type. Because the touch typist only rests the stationary weight of their fingers on eight keys in the Home Row, a keyboard optimized for a highly skilled touch typist does not require other keys to have resting resistive force. Existing mechanical keyboards and keyboard overlays, however, provide the same resting resistive force on all keys.

Touch typing is a very dynamic activity. The average typing speed of a trained touch typist is 38-40 words per minute (wpm). Highly skilled typists achieve 100-120 wpm range. Thus, keystrokes occur at average rates ranging from 300-100 ms with peak rates at even shorter time intervals. In order to achieve these rates, a typist must rapidly accelerate fingers at the start of each keystroke. Left unchecked, this acceleration would continue through the full length of key travel causing the typist's finger to hit the end of key travel (also known as "bottoming out") at a high speed and with maximum momentum and kinetic energy. Keyboards which permit "bottoming out" force the typist to expend a large amount of time and energy recovering, resulting in slower typing performance and increasing the likelihood of induced repetitive stress injury. Keyboards designed for optimal touch typing must decelerate the typist's finger after the key press has been initiated, through the length of travel of the key, and ideally before the finger reaches the end of key travel. Thus, even if the finger does reach the end of travel, the deceleration provided by the key switch will significantly reduce the finger's impact when it reaches the end of travel. This enables the typist to easily reverse direction with the least amount of expended energy.

Finally, a keyboard optimized for touch typing gives the typist's finger a spring-back force on the return that helps accelerate the typist's finger in the reverse direction.

A keyboard optimized for touch typing also provides a tactile cue that a key has been successfully actuated. This is typically done by varying the rate of increase of resistive force or decreasing the resistive force just before the key's actuation point. By necessity this cue is subliminal and is mainly in place to assist people touch typing at high speeds: keystroke rates of 50 ms-300 ms are so fast that conscious reactions to actuation cues are not possible.

Touch typing performance is also affected by the pressure required to actuate a key and the length of key travel before actuation occurs. The more pressure that is required over a longer distance, the greater the work that is required of the typist and therefore the slower typing will be. However, too little pressure and too short a key stroke would not give the typist sufficient tactile feedback and finger cushioning, nor would it allow the user to comfortably rest fingers on the home row without inadvertently depressing a key to the point of accidental actuation.

Finally, typists have a wide range of preferences in the characteristics of a keyboard, based on their level of typing skill and personal preferences. For example, a typist who is new to touch typing might prefer a keyboard with higher resistive force through the length of key travel and a more pronounced pre-actuation cue in order to more effectively learn. A fast, experienced typist might prefer a low travel keyboard that has minimal resistive force but a high spring-back force that allows typing fastest. Some typists prefer one style of pre-actuation feedback; other typists prefer a different style, etc.

Today, there are three keyboard technologies in common use for touch typing:

Rubber domes. The key cap is connected by a plunger to a rubber dome. The rubber dome collapses at a point in the downward travel of the key and snaps back up when finger pressure is released. This produces the tactile feel and actuation cueing for this type of keyboard.

Scissor switches. These are a variation of rubber dome keyboards that allow for greatly reduced travel. They are primarily used in laptop computers. The rubber dome still produces the tactile feel and actuation cueing.

Mechanical switches. These use springs, levers and indents to produce their tactile feel and cueing.

Conventional keys are constructed with a hard key cap that extends over the edges of the key and is tightly coupled to the plunger tied to the underlying mechanism within the body of the key switch. Even though touch typist's fingers often hit the non-home row rest keys at an angle, the finger's angular trajectory is converted to vertical trajectory by the constrained coupling of the key cap to the key's vertically oriented plunger. Therefore, all mechanical keys actuate vertically. Even flexible, waterproof keyboards with rubber key caps and sidewalls have thick, hard key caps, and work in this manner redirecting non vertical finger trajectories to vertical key travel.

The primary characteristics of keyboards relevant to optimization for touch typing can be characterized in the following categories and ranges:

Key travel. Ranges from 3.5 mm-4 mm for "full travel" desktop keyboards, and 2 mm-3 mm for laptop and subnotebook computers, due to the severe height constraints on keyboards for those devices.

Key actuation force. Ranges from approximately 30-70 giants.

Finger resting resistance. Ranges from approximately 10-20 grams.

Tactile pre-actuation cueing. The existence of a tactile pre-actuation cue is optimal.

Deceleration. Decelerate a finger over the length of key stroke to the point where the finger can be reversed before reaching end of travel is optimal.

Spring-back. Ranges from 5-50 grams.

FIG. 1 shows a typical graph of actuation force as a function of key travel distance (aka a force displacement curve) for a full-travel mechanical key that is used for touch typing. The force curve 12 is linear for approximately the first 1.0 mm of travel, then increases rapidly, forming a pressure point 10 that the typist must overcome. This point is known as the pre-actuation cue. This is followed by a steep reduction in force 14 which only begins to increase just short of the actuation point 11 of the switch. The pre-actuation cue will cause the typist to experience a tactile "bump" when they strike the key and travel past the pressure point, which provides the subliminal indication that the key will be successfully actuated. The decrease in resistive force 14 immediately after the pressure point ensures that the typist's finger will always pass through the actuation point 11 of the key switch, which in this example occurs at approximately 2 mm of travel. The force curve returns to linear 15 following the actuation point; this decelerates the typist's finger after actuation has occurred. The end of key travel 16 for this key is at 4 mm, where the force curve goes essentially vertical 17. If the typist's finger is still moving forward at this point, it will encounter the end of travel and be stopped. An effective high speed typist will be able to reverse finger direction before hitting the end of travel, or will hit the end of travel with much reduced force, compared to the force they would hit it with if the key did not provide deceleration. The lower line on the graph 13 shows the force displacement curve when the typist's finger is travelling in the reverse direction (up—away from the key switch). The resistive force of the key in this direction generally acts as an accelerator of the reverse motion of the finger, providing a spring-back effect.

FIG. 2 shows a typical force displacement curve 20 for a key switch with a linear force curve. Since the typist's finger is still accelerating when it first lands on the key, the key's linear resistance will feel low. As the resistance rate increases linearly throughout the length of travel, the typist receives no tactile feedback or pre-actuation cueing. The act of "bottoming-out" at 4 mm travel 21 would be the first indication to the typist that the key is actuated 11. Therefore, key switches of this type cannot be used for effective touch typing; instead, they are typically used by computer gaming enthusiasts, where repeated, fast actuation of a small number of keys is paramount.

FIG. 3 shows a typical force displacement curve 30 for a mechanical key switch that has a graduated linear force curve, where the slope increases in stages over the range of key travel. An example of this kind of key switch is shown in the U.S. Pat. No. 4,529,849 patent. This type of key switch is used for touch typing. The first segment of travel 31 has a slope similar to the tactile actuation key, and works in the same manner. But then the slope of the curve increases significantly 32. The typist feels this as an increase in the rate of deceleration of their finger which gives him a subliminal tactile cue that actuation is imminent and it is time to start reversing. At this point the typist's finger still has enough forward momentum to reliably pass through the key's actuation point 11. As soon as the actuation point 11 is passed, the linear rate of force increases to an even higher rate 33 further decelerating the typist's finger. This makes it less likely that the typist will "bottom out." Forward and reverse force displacement curves 30 are approximately identical. Spring-back force for this key is highest at the point of finger trajectory reversal 34. This results in a "lively" feel.

The force displacement curves 12, 30 shown in FIGS. 1 and 3 exhibit a very sharp approximately vertical slope 18, 35 at the early moments of finger contact with the key top travel leveling down to a linear approximately 10 cN/mm slope 19, 31. The typist's finger encounters enough resistive force for rest support somewhere along this initial slope and well before the finger reaches the actuation point 11 at significantly higher resistive force and travel. This common characteristic is essential to and provides the typist with the ability to rest their fingers on the home row keys.

FIG. 4 shows a typical force displacement curve 40 for a representative laptop rubber dome scissor switch that is used for touch typing. This key switch has 2 mm of key travel, substantially shorter than the full-travel mechanical switches shown in FIGS. 1 and 3. Since tactile actuation cueing is a very desirable and expected feature, the pre-actuation portion of the force curve 10 has been left largely unchanged while the post-actuation portion 41 has been significantly reduced, compared to the mechanical switch shown in FIG. 1. Note that the actuation point 11 is very close to the end of key travel 42 for these types of key switches.

Touch sensing technology has been available since the 60s, but the first commercially available touch screen, eg FIG. 5A, which combines a transparent touch sensing panel 50 on top of a Plasma, CRT, LCD or OLED display panel 51, was developed in 1974 by Elographics. The touch detection technology used by Elographics is known as analog resistive. It is a pressure sensing technology: touch panels are composed of two flexible sheets 52, 53 coated with an electrically resistive material and separated by an air gap 54 or microdots 55, as illustrated in FIG. 5A. When pressure is applied to the surface of the touch screen 56, the two sheets are pressed together 58, and make electrical contact, see FIG. 5C. One sheet supplies the x position, the other sheet the y position of the touch, as measured by the current resistance values.

Analog resistive technology requires substantial activation pressure to register a touch, on the order of 50-100 grams. The actuation pressure must be applied for the entire duration of the actuation period, as illustrated in FIGS. 5A, 5B and 5C. FIG. 5A shows the point where the user's finger 57 first touches the surface 53 of an analog resistive touch screen. Even though the user's finger has already made contact with the hard surface 53 of the touch screen, no detection of the user's finger has yet occurred. FIG. 6b shows that the user's finger 54 has now depressed the touch screen to the point where there is partial contact 59 between the top 52 and bottom 53 conductive layers. But touch panel contact measurements are not stable at this point; the user must push through to full contact 57 in order to generate a reliable steady actuation, as shown in FIG. 6c. Because of the force required, a pressure concentrator (also known as an energy director), such as a stylus or nib on the bottom of a key is often needed in order to enable the user to easily actuate an analog resistive touch screen. Analog resistive is a single-point touch detection technology—that is, it is only able to detect one location or point on the touch screen at a time. If multiple touch points are present, an erroneous location is reported.

Analog resistive technology was used in the first commercially available smart phone, the IBM/Southwest Bell Simon, which was released in 1992. Analog resistive is still the most popular touch screen technology in use today.

The Simon had a virtual keyboard—that is, an alphanumeric keyboard implemented in software that uses a touch screen to display the keys and senses when the user taps on a key to actuate it. Many subsequent analog resistive touch screen devices have also implemented virtual keyboards. However, these can only be used for "hunt and peck" typing, not touch typing, because of the following shortcomings:

In order for an analog resistive touch screen to reliably register key actuation, key strokes must be "bottomed out" with significant force and held down for a period of time.

Single-point touch detection doesn't allow simultaneously holding down the shift key and striking another key, nor does it allow for multi-key rollover.

Therefore, this approach never achieved significant commercial success. In 1993 AT&T released the EO Communicator, a tablet-sized device with a single-point, pen-based touch screen and an operating system, PenPoint, designed specifically for pen input and handwriting recognition as the primary input mechanism. Microsoft subsequently released a pen-based version of the Windows operating system with the same general characteristics, and many manufacturers began producing pen-based tablet devices with touch screens optimized for styluses. For the next 17 years, pen-based devices dominated the tablet-sized device space. Virtual keyboards on these devices could not be used for touch typing, and handwriting recognition was inaccurate and very time consuming to use. These devices as a whole served a relatively small niche market and never achieved broad commercial success, in large part because of their inadequate approach to input.

A better solution for input on tablet devices would be if users could utilize their existing typing skills and be able to enter data with the same speed and accuracy as they do on a physical keyboard. At the same, this mechanism would need to maintain the small size and weight advantage that a tablet computer had over a laptop computer.

In order to facilitate this sort of solution, a different touch screen technology needs to be used—one that supports multipoint (the ability to detect any number of simultaneous touches) and one that doesn't require force to register a key stroke. Proximity-based touch screen technologies that detect the user's fingers when they are close to the touch screen without actually touching it, meet these requirements. Several touch screen technologies provide both multi-touch and proximity-based detection.

For example, surface acoustic wave (SAW) technology uses ultrasonic transducers and receivers to set up a field of ultrasonic sound waves over the touch panel. When the panel is touched, a portion of the wave is absorbed by the user's finger. This change is used to register the position of the touch event. However, SAW technology requires high power and a thick bezel to house the transducers. It is therefore not usable for mobile devices.

Vision-based optical systems use an infrared video camera mounted underneath a hard, transparent plate to detect the presence of objects touching the surface of the plate. Infrared light is used to illuminate the plate, either by injecting it into the side of the plate or by illuminating the underside of the plate with infrared light from below. Objects touching the surface change how the infrared light is reflected; these changes are measured with a video camera. However, given their size and power requirements, they cannot be used in mobile devices.

Digital resistive touch panels share the same manufacturing process as analog resistive. Unlike analog resistive, they support multi-touch, since the conductive material covering the touch panels is etched into a pattern of rows on one panel and columns on the other. When pressure is applied to the top panel it bends slightly, creating electrical contact between the two layers at the touch point. In effect, there is a small microswitch at each intersection point in the grid. The rows and columns are continuously scanned, looking for switch closings. Digital resistive technology requires significantly less force to register a touch than analog resistive, but it is still a pressure-based technology with the drawback of requiring a key stroke to "bottom out" on the touch screen's surface.

Capacitance touch technology is proximity-based. It utilizes the fact that the human body is a conductor in order to change the characteristics of an electrostatic field. Surface capacitance technology is the simplest form of capacitance touch sensing. It consists of an insulator such as glass, coated on one side with a transparent conductive layer. A small voltage is applied to the conductive layer, resulting in a uniform electrostatic field. When a person finger touches the surface of the screen, the screen's electrostatic field is distorted, which can be measured as a change in capacitance. However, surface capacitance technology only detects single-point contact not multiple point contact as required for touch typing, such as using a "shift" key along with a letter key to indicate a capital letter.

Projected Capacitive technology (Pro-Cap) is a recent refinement of capacitive technology that utilizes an X-Y grid that is formed by etching one or two transparent conductive layers to form a grid. The grid is repetitively scanned in order to detect changes in capacitance across the grid. Pro-Cap makes use of the fact that most conductive objects are able to hold a charge if they are very close together. If another conductive object, such as a finger, comes close to two conductive objects, the charge field (capacitance) between the two objects changes because the finger's capacitance "steals" some of the charge. The E-field lines are "projected" beyond the touch surface when a finger is present, thus touch detection occurs in a proximity zone that starts slightly above the touch screen surface and therefore does not require the touch screen surface to be touched in order for a finger to be registered.

There are two types of Pro-Cap technology: self capacitance and mutual capacitance. Self capacitance systems serially scan each row and column in the grid and therefore only provide single-point detection.

Mutual capacitance systems scan the intersections of each row and column and measure the capacitance at each intersection. Therefore, mutual capacitance systems are multi-point.

In addition to appropriate touch screen technology, the tablet device would need to be large enough for a virtual keyboard with a lateral key pitch appropriate for touch typing, as described above. This system would also need to have a sophisticated virtual keyboard that took full advantage of this touch screen technology and handled all the requirements of touch typing.

In 2004, Apple Computer filed U.S. Pat. No. 7,663,607. This patent describes a mutual capacitance Pro-Cap technology that is appropriate for touch typing. Additionally, U.S. Pat. Nos. 7,479,949 7,602,378, 7,614,008 and 7,844,914 describe a virtual keyboard designed to work with this type of touch screen technology. In 2007 Apple released the iPhone. This was the first time that a proximity-based, multi-touch device with a matching virtual keyboard as described in these patents became generally known in the industry. In March of 2010 Apple released the iPAD®, a tablet-size device with a 9.7" diagonal touch screen that utilized equivalent Pro-Cap technology. The iPAD® has a virtual keyboard as described in U.S. Pat. Nos. 7,602,378, 7,614,008 and 7,941,760. These show the characteristics of virtual keyboard software in modem touch screen devices.

The virtual keyboard described in these patents has sophisticated software features designed to optimally handle touch typing. For example, properly handling the touch typing finger trajectories on a Pro-Cap touch screen is outlined in U.S. Pat. No. 7,812,828. Another important feature is that the virtual keyboard extends the touch detection area of a key into the visual border that visually separates the keys. Therefore, all locations on the virtual keyboard will register a key press. Also, the virtual keyboard handles the case where a finger strike overlaps two or more key boundaries by analyzing the shape of the multiple touch screen points actuated by the pad of the user's finger to determine the nearest key. These virtual keyboards have an additional layer of software that provides automatic correction of mistyped words, partly based on an analysis of adjacent letters on the keyboard. For example, if the user enters the word "oace" instead of "pace" on a QWERTY virtual keyboard, there are four possible corrections—"face", "lace", "pace", "race." However, the proximity of the "o" key to the "l" and "p" keys allows the virtual keyboard software to eliminate the "face" and "race" possibilities. The choice between "lace" and "pace" will be made based on whether the key stroke that registered the "o" was closer to the "l" key or the "p" key. Finally, these virtual keyboards also work at the sentence level. They automatically capitalize the first word of a sentence, and will automatically add a period to the end of a sentence if two spaces are entered to indicate the start of the next sentence.

The iPAD®'s 9.7" touch screen size allows for a virtual keyboard with 18 mm key pitch. This is smaller than the ideal 19 mm-19.5 mm key pitch of a full-size mechanical keyboard. However, the virtual keyboard software makes up for this by expanding the touch areas and intelligently handling overlapping touches in a way that a physical keyboard cannot, as described above.

Thus, the iPAD® was the first touch tablet device that met the basic hardware and virtual keyboard software requirements needed to support optimized touch typing on a touch screen device. This has proven to be a popular approach with users, resulting in considerable commercial success for the iPAD®. The iPAD® achieved a market share of approximately 90% in its first year of availability. A host of competitors to the iPAD® that also meet basic touch typing requirements emerged about a year after the iPAD® launch—for example, the Motorola XOOM®, the Samsung GALAXY TAB 10.1® and the HP TOUCHPAD®. These devices have multi-point Pro-Cap touch screens, sophisticated virtual keyboards and screen sizes large enough for virtual keyboards that can support touch typing.

Even though these devices have the necessary touch screen and virtual keyboard support, touch typing is still severely compromised. The issues are:

1. Typists cannot rest their fingers on the home row of the virtual keyboard displayed on the touch screen, since this would immediately trigger multiple unwanted key actuations.
2. There is no mechanism for decelerating the typist's fingers before they impact the touch screen. Given the ballistic nature of high speed touch typing, typist's fingers strike the hard touch screen at a high rate of speed with every key stroke. This can result in significant discomfort for the typist and increases the likelihood of repetitive stress injuries over time. This is especially ironic, since proximity-based touch screens such as Pro-Cap can detect the typist's finger prior to it even making contact with the surface of the touch screen.
3. It is difficult for touch typists to reliably ascertain that they have correctly actuated a key when typing rapidly on these devices, since there is no subliminal tactile cue prior to actuation. The only tactile cue the user receives is from impact with the touch screen. This causes a significant decrease in typing speed and increases error rates.
4. There is no spring-back when the typist reverses their finger after completing a stroke. This results in slower typing speeds and less comfort while typing.
5. There are no tactile reference points for detecting the location of keys on the virtual keyboard. Thus, it is very easy for a touch typist's fingers to inadvertently drift off the key locations over time during typing. In order to compensate, typists must look down at the keyboard at all times. This eliminates one of the major benefits of touch typing—allowing the typist to focus their attention on something other than the keyboard while typing.

Note that these issues apply to any device with a touch screen and a virtual keyboard capable of touch typing, not only tablet computers. For example, accountants and others who focus on numeric data entry, touch type on the numeric keypad found on many mechanical keyboards. So, a non-portable numeric keyboard implemented via a small, stand-alone touch screen that connected to a traditional computer would encounter the same issues.

The present invention addresses all of these issues on all types of touch screen devices that have virtual keyboards that would otherwise be capable of supporting touch typing.

Prior art exists for touch screen keyboard overlays. However, the prior art does not address the requirements for touch typing on multi-touch, proximity-based touch screens and virtual keyboards such as those found on the iPAD® and similar devices. In fact, many prior art designs prevent touch typing from functioning properly in this environment by blocking the virtual keyboard and its software from accessing vital information about finger position. The software utilizes this position data to maximize its error-correcting facilities. Therefore, by restricting touch input to the visual boundaries of the keys on the virtual keyboard as opposed to expanded touch areas that include the visual borders between keys, many prior art touch screen overlays introduce "dead zones". These overlays do not allow touch registration from all touch typing finger trajectories, etc.

As described herein, pressure-sensitive and Surface Capacitive touch screens require touch typing users to "bottom out" each key stroke. Thus, all of the features designed to keep this from happening (pre-actuation tactile cueing, finger deceleration, spring-back) are not available in keyboard overlays that are designed for these types of touch screens, since they need the user to bottom out while typing in order to actuate the touch screen. These features are critically important enablers for optimal touch typing.

Keyboard overlays which are designed to transmit pressure from the bottom of the keyboard overlay to a pressure-sensitive touch screen sometimes concentrate this pressure by attaching force directing nibs to the bottom of their key structures. For example, ref. no. 306 in US Patent Application 2003/0235452 shows an exemplary pressure concentrator.

This feature will actually disable proper functioning of a proximity-based touch screen since these nibs will keep the user's fingers too far away from the proximity detection threshold to be registered.

Prior art keyboard overlays often create "dead zones"—regions in the keyboard overlay that impedes a key stroke from registering on a proximity-based touch screen because the user's finger is blocked from getting into proximity by the material that makes up the keyboard overlay, or when a key structure folds over itself when depressed and creates a thick zone that doesn't allow the finger to get into detection proximity.

In some cases these regions are created inadvertently, for example, a keyboard overlay that was designed to be used with pressure-sensitive touch screen would not need to be concerned with "dead zones" since pressure is still transmitted to the pressure-sensitive touch screen. Sometimes they are created by design, with the "dead zone" a part of another feature previously believed to be beneficial.

One example of a "dead zone" is an extra ridge on the perimeter of a key top, as illustrated in ref. no. 308 in US Patent Application 2003/0235452. A ridge of this nature is not a problem for a pressure-sensitive touch screen, since the pressure will be correctly transmitted from the user's finger to the ridge, then to the bottom of the keyboard overlay and then to the pressure-sensitive touch screen. However, it is a major problem for a proximity-based touch screen, since the ridge will keep the user's finger from getting within range of the proximity-based touch screen. An attempted keystroke passed through this overlay will therefore not be registered on a proximity-based touch screen.

Another example of a "dead zone" is a rigid frame that surrounds each key structure on the keyboard overlay, as illustrated in ref. no. 314 in US Patent Application 2003/0235452. Such a rigid frame might be required by a keyboard overlay designed to work with a single-point pressure-sensitive touch screen in order to avoid inadvertent pressure interaction between multiple keys. However, it acts as a detriment to proper functioning of a proximity-based touch screen, since the frame keeps valid key strokes from registering. This is especially the case for touch typing, where lateral, (also known as shallow angle) key strokes (both North/South and East/West) will often strike a key at a non-vertical angle and are easily blocked by a rigid frame.

Prior art key structures with thick sidewalls also introduce "dead zones." These sidewalls do not depress or collapse when a key is pressed, as illustrated in ref. no. 300 in US Patent Application No. 2003/0235452. The thick sidewalls interfere with lateral trajectory key strokes and even vertical trajectories when the finger is slightly off-center of the key. These types of key strokes are natural to touch typing, but will not register on a proximity-based touch screen because of the construction of the prior art keyboard overlay.

"Dead zones" are problematic because they cause key strokes to be lost, and interfere with the ability of a modern virtual keyboard's software to correctly perform touch recognition. Multi-point touch screen software detects many points when a finger comes into proximity, and the shape and size of touch locations are analyzed to determine the nature of the touch—was it a finger, the heel of a hand, or an accidental glancing touch that should be ignored? A "dead zone" that is a significant fraction of the finger contact area can cut off a portion of the distinctive shape of a finger press that the software is looking for. Also, modern virtual keyboard software is designed to accept all key strokes and recognize complete words and sentences. So even if a particular key stroke is misrecognized at the character level, the location of the user's finger as detected by the touch screen will be later used as part of word-level recognition and correction. If this information is partially or completely lost because of a keyboard overlay induced "dead zone", word-level correction will potentially fail completely.

Another problem with the "dead zones" is that modern tablet computers such as the iPAD® and XOOM® allow the user to hold their finger down on the virtual keyboard for a period of time to bring up a menu, which can then only be accessed by keeping their finger in proximity and sliding it over the menu. For example, this is used to display all of the accented variations of a letter (i.e. holding down the "e" key 60 for a period of time will bring up a secondary menu 61 with è, ê, ë, etc.), as shown in FIG. 6. This is impossible to execute if there is a frame or "dead zone" around each key structure or even if as in this example, the "dead zone" is located only to the north of the virtual key. If the overlay key structure sidewalls are too thick for touch screen registration, or if there is any other "dead zone" on or around the key structure, then this secondary menu functionality will likely be lost.

The key structures and key arrays in the prior art are not designed for effective touch typing. Prior art keyboard overlays often simply copy the visual appearance of the key caps on a conventional keyboard, as illustrated in ref. no. 300 in US Patent Application No. 2003/0235452 and ref. no. 401 in US Patent Application No. 2007/0013662. However, these key structures do not provide the appropriate non-linear resistive force, nor enough absolute resistive force over the length of key travel for effective touch typing. These prior art key structures have force displacement curves 65 similar to the one shown in FIG. 7.

In this force displacement curve 65, resistive force increases from zero as the user's finger starts to compress the overlay against the touch screen 66, and rises rapidly as the material in the overlay reaches maximum compression attainable by human generated force 67. There is no pre-actuation tactile cue, no resistive deceleration of the user's finger before it "bottoms-out" against the touch screen's surface, and insignificant spring-back on the return.

Furthermore, this force displacement curve 65 does not allow users to rest their fingers on the home row keys without accidentally triggering the touch screen.

Some prior art keyboard overlays are complex mechanical apparatuses composed of many parts, each of which has to be manufactured and then assembled together, as shown in FIG. 5 in US Patent Application 2010/0302168, and FIG. 4 in Great Britain Patent Application 1996-GB-2313343. These types of keyboard overlays do not actuate the underlying touch screen directly with the user's finger; instead they utilize indirect mechanical means to trigger actuation, typically driven by physical keys with hard key tops. They essentially take a mechanical keyboard assembly, replace the electrical switches with mechanical actuators and position the resulting apparatus on top of a touch screen.

In the case of FIG. 5 in US Patent Application 2010/0302168, the touch screen is triggered by an actuation nib made of conductive material that is fastened to the bottom of a key rod. In the case of FIG. 4 in Great Britain Patent Application 1996-GB-2313343, a system of infrared LEDs and photo detectors is used to register key presses, not the underlying touch screen.

These types of keyboard overlays interfere with the operation of modern virtual keyboard software. This software uses the shape and precise location points that the pad of the user's finger registers on the touch screen for character, word and sentence level analysis. Since these keyboard overlays use mechanisms such as conductive nibs to trigger the touch screen, they will give unexpected location information to the virtual keyboard's software when a user accidentally presses an incorrect key. This will potentially cause the virtual keyboard's software to behave incorrectly.

The following is a review of several prior art keyboard overlay patents that are representative of the different types of prior art:

U.S. Pat. No. 5,572,573 describes a physical overlay that is placed over the touch screen of a mobile phone. The overlay is composed primarily of a material whose desired structural properties are only attainable in wall thicknesses that would block actuation of the touch screen. The overlay contains cut out holes over specific areas of the touch screen, allowing the user to find specific locations on the touch screen without looking at it. The frame of this overlay is a continuous "dead zone" that would not work for touch typing as described above. There are no key structures whatsoever in this design, just a hole, so resting fingers on the home row would actuate all the keys.

U.S. Pat. No. 5,909,211 describes a computer system with multiple replaceable overlays for a touch workpad, including a full-size keyboard overlay. However, these overlays do not contain any key structures, and are therefore unsuitable for touch typing.

U.S. Pat. No. 5,887,995 describes a tactile overlay that goes on top of the single-point capacitive touchpad typically found below the keyboard of a notebook computer. This overlay is composed of a flat, flexible plate with dome-shaped "tactile response elements" attached to the bottom of the plate. It does not have a have force displacement curve appropriate for touch typing and is a complex assembly that does not allow the user to see the underlying indicia. Additionally, the assembly, being made up of a stack of parts will, when structurally capable of providing proper resistive force for touch typing, keep the user's finger tips out of range of detection of the underlying touchscreen. Finally, there are no tactile features on the top surface of the overlay, which makes it unusable for touch typing.

U.S. Pat. No. 6,667,738 describes a tactile overlay for the 10 digit numeric keypad of a cellular phone with a touch screen. The overlay is composed of dome-shaped keys, similar to those described in U.S. Pat. No. 5,887,995. This overlay will also exhibit a force displacement curve similar to that of calculator keys, which isn't appropriate for touch typing.

US Patent Application No. 2003/0235452 (and subsequent U.S. Pat. Nos. 6,776,546, 6,880,998 and 7,659,885) describes a full-size keyboard overlay that that provides location tactile references that enable a user to align their fingers over the keys of a virtual keyboard (however, it does not disclose using sharp key top edges for this purpose, as described herein). This patent describes keyboard overlays designed to be used with pressure-sensitive touch screens, and has all the problems with "dead zones", pressure concentrators on the bottom of keys, etc. on proximity-based touch screens, as described herein. The key structures disclosed in this patent do not have any of the necessary attributes needed for touch typing, as described herein, nor will they enable users to rest their fingers on the key structures without triggering the underlying touch screen. Their keyboard overlays are designed for a single-point touch screen, not multi-touch, as shown on Page 8 of this patent application, and will therefore not work correctly with modern virtual keyboards, as described herein.

US Patent Application No. 2010-0238119 describes a keyboard overlay and attached case for an iPhone. The key structures described in this patent do not have any of the characteristics required for effective touch typing, as described herein. Also, it is not 0 designed to work on the size (or pitch) of keyboard required for touch typing.

US Patent Application No. 2010/0302168 describes a complex mechanical keyboard overlay consisting of multiple physical keys with hard key tops, actuator rods, etc. The key structures described in this patent do not have any of the characteristics required for effective touch typing, as described herein.

Great Britain Patent Application No. 1996-GB-2313343 describes a complex mechanical keyboard overlay consisting of a see-through hard plastic key array that sits on top of an LCD display (not a touch screen). Infrared LEDs and photodetectors are used to sense when keys are depressed. The key structures described in this patent do not have any of the characteristics required for effective touch typing, as described herein.

SUMMARY OF THE INVENTION

The present invention is a keyboard overlay designed to go on top of a virtual keyboard on a proximity-based touch screen. An embodiment is made from a very thin sheet of elastomeric material formed into key structures with novel mechanical geometries that enable the performance and tactile characteristics of mechanical key switches to be emulated. Additionally, key structures with new performance and tactile characteristics that have heretofore not existed can be created. The keyboard overlay is composed of multiple key structures, each of which is oriented over a corresponding key on the underlying virtual keyboard. The present invention includes a design methodology that enables creating a wide variety of key structures that will always be compatible with touch screen and virtual keyboard requirements and characteristics.

All the key structures on a keyboard overlay can be of the same design, or different key structure designs can be combined in a single keyboard overlay, resulting in a keyboard overlay with uniquely beneficial characteristics.

One specific use of the present invention is in conjunction with a portable tablet device, such as the Apple iPAD® or the Motorola XOOM®. It is desirable to be able to store the keyboard overlay with the device in an unobtrusive manner, yet be able to easily deploy it when the user wishes to type, and retract it when typing is complete. The present invention can be combined with additional mechanisms to perform these functions.

DETAILED DESCRIPTION OF THE PREFERRED EMBODIMENT

Figure 1:
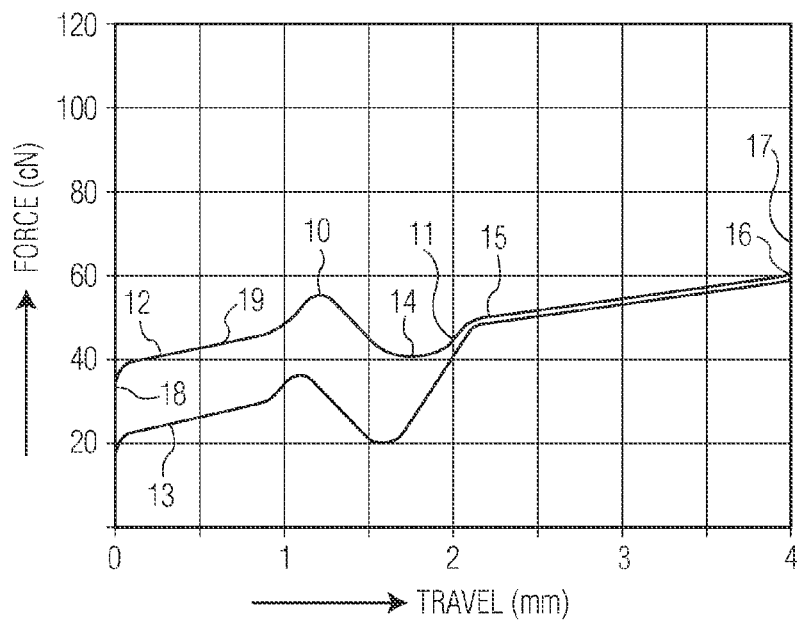
FIG. 1 shows the force displacement curve of a typical full travel mechanical key switch used for touch typing.
Figure 2:
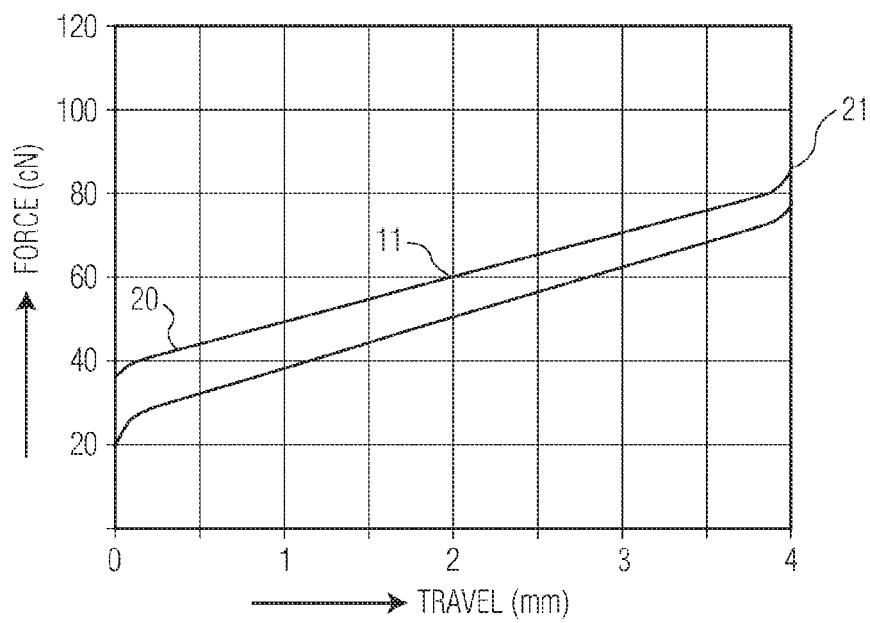
FIG. 2 shows a linear force displacement curve for a mechanical key switch which is typically used for gaming, not touch typing.

The present invention is a keyboard overlay designed to work in conjunction with a multi-touch, proximity-based touch screen that displays virtual keyboard with large enough key pitch to allow for touch typing. It is made from a very thin sheet of elastomeric material (silicone rubber, TPE, Vyram, Santoprene, Polypropylene, etc.) that is formed into multiple key structures, each of which is oriented over a corresponding key area on the underlying virtual keyboard displayed on a touch screen. These key structures have novel mechanical geometries that enable the performance and tactile characteristics of mechanical key switches to be reproduced. Additionally, key structures with new performance and tactile characteristics that have heretofore not existed can be created. The present invention enables a wide variety of key structure designs.

All the key structures on a keyboard overlay can be of the same design, or different key structure designs can be combined in a single keyboard overlay, resulting in a keyboard overlay with characteristics beneficial to touch typing.

One specific use of the present invention is in conjunction with a portable tablet device, such as the Apple iPAD® or the Motorola XOOM®. It is desirable to be able to store the keyboard overlay with the device in an unobtrusive manner, yet be able to easily deploy it when the user wishes to touch type and retract it when touch typing is complete.

The key structures that make up the keyboard overlay provide the following features:

Performs harmoniously with the characteristics of proximity-based touch screens and modern virtual keyboard software Simple, lowest cost manufacturing approach Able to handle all touch typing finger trajectories Able to perform well for both centered and all off-center finger trajectories Dynamic performance and tactile characteristics of key structures:

Enough initial resistive force to enable the user to rest their fingers on the home row rest key structures A discernible change in the rate of resistive force/displacement after the maximum resting resistance point is overcome but before touch screen actuation—also known as pre-actuation tactile cueing Increased resistive force that decelerates the user's finger before it "bottoms-out" against the touch screen's hard surface, thus allowing the user to comfortably and efficiently reverse finger direction Spring-back that helps accelerate the user's finger in the reverse direction.

The top surface of the key structure has a desirable tactile feel to the user

The key structures are flexible enough to allow the user to slide their finger across the key structures without losing registration on the touch screen, allowing the user to input touch gestures or utilize secondary option menus Home row rest keys can be easily distinguished from other keys by feel, with visual cues, or both The key-top land areas of the key structure can encompass the maximum real estate available for the corresponding key on the underlying virtual keyboard, including the area within the border between keys that still triggers that key A variety of tactile finger location mechanisms that are compatible with the other aspects of the present invention using sharp east/west edges of the key structure, raised home row rest key structures, different tactile feel of the home row rest keys, or by other means compatible with the present invention Cushioning and sound dampening Optimal viewing of the indicia of the underlying virtual keyboard Ability to develop distinctive aesthetics for the keyboard overlay Ability to work well for people with long fingernails Key structures designed for optimal performance and use in home row rest key positions Key structures designed for optimal performance and use in non-home row rest key positions Key structures optimized for use as special keys (return, space bar, etc.)

Figure 38:
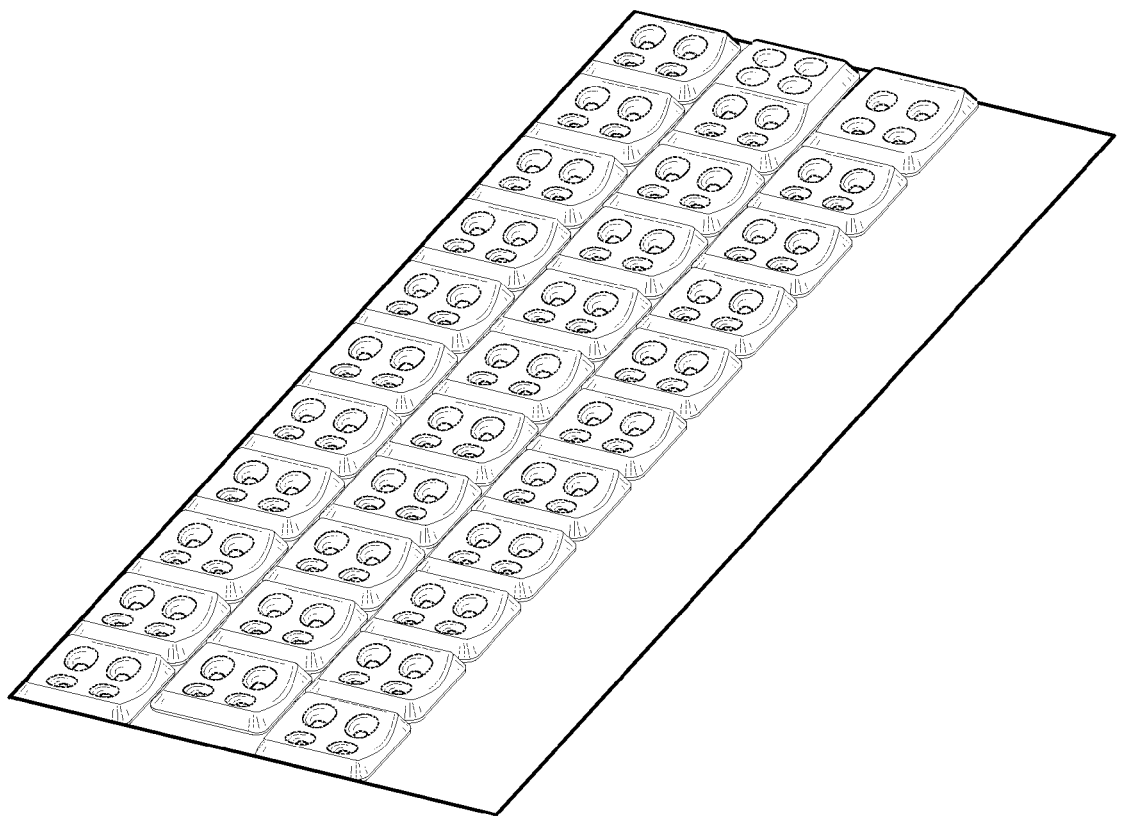
FIG. 38 shows a key array containing the same key structure design in each key location—a uniform key array.

All the key structures on a keyboard overlay can have the same design, known as a uniform key array, as shown in FIG. 38. The primary advantage of this approach is that the overlay has a uniform appearance, similar to existing mechanical keyboards, which can provide a sense of familiarity or accessibility to a user. Furthermore, many users may be average touch typists who sometimes look at the virtual keyboard and who benefit from maximum cushioning of keys. These typists should benefit from uniform key resistive performance and appearance.

However, key structure design in a uniform key array will be a "least denominator" compromise, since it must accommodate the different requirements of each key. A keyboard overlay with different key structures will be able to optimally accommodate the specific requirements of each type of key in the underlying virtual keyboard.

This is a fundamental difference between a mechanical keyboard and the present invention. In the case of a mechanical keyboard, producing substantially different characteristics, such as keys with different lengths of key travel, for different keys on the same keyboard would require a complex manufacturing process. By contrast, manufacturing different key structure designs in the present invention is only a matter of designing the mold as needed. There is no change in the unit cost of manufacturing that is associated with optimizing each key structure for its underlying virtual key requirements.

There are many ways to mix and match key structure designs to keyboard overlays. This patent covers all possible variations, as well as including the concept of multiple key structure designs in a single keyboard. Several examples of keyboard overlays containing multiple types of key structures are provided herein.

The present invention utilizes the user's finger to trigger the underlying proximity-based touch screen. This ensures that the virtual keyboard software in modern proximity based touchscreens will always correctly recognize key strokes.

Figure 8:
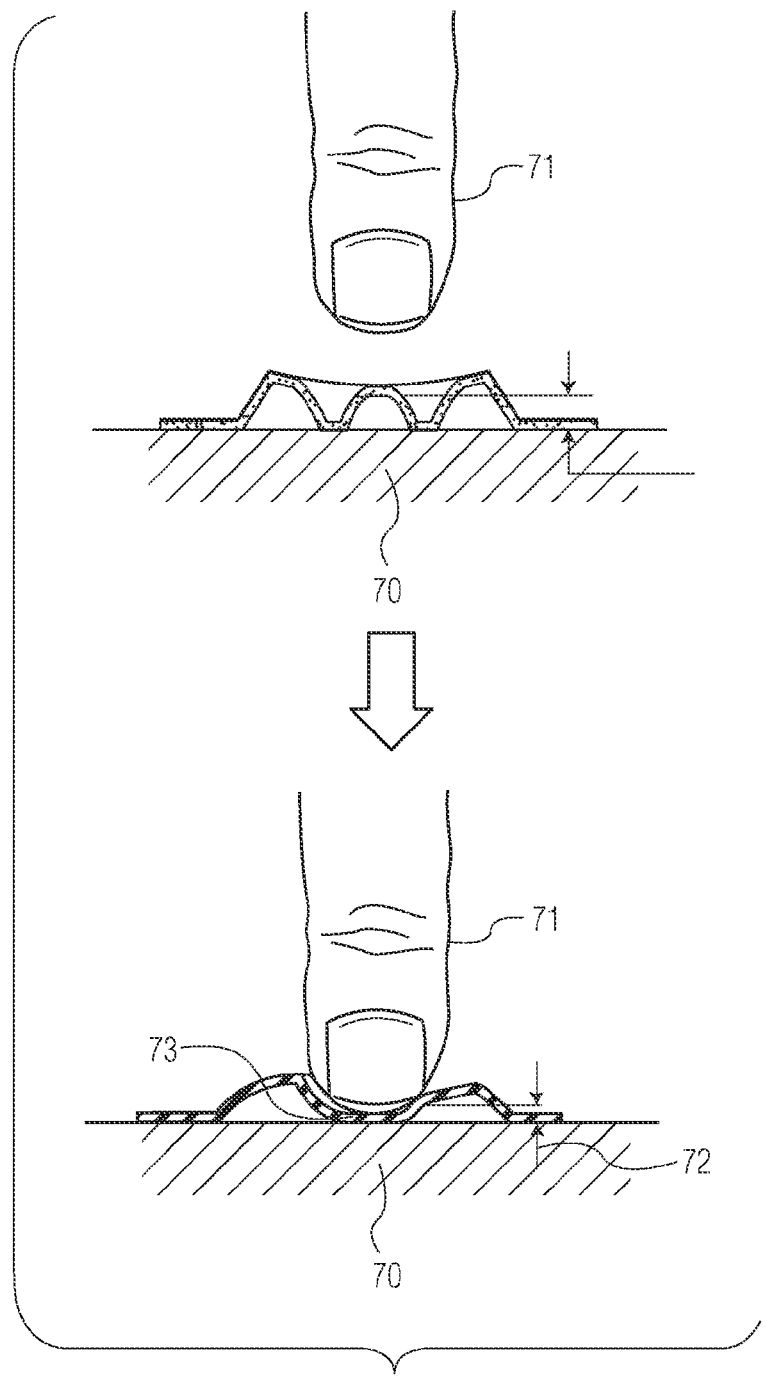
FIG. 8 shows how the user's finger is able to come into proximity of the touch screen at the end of a key stroke with the present invention.
Figure 9A:
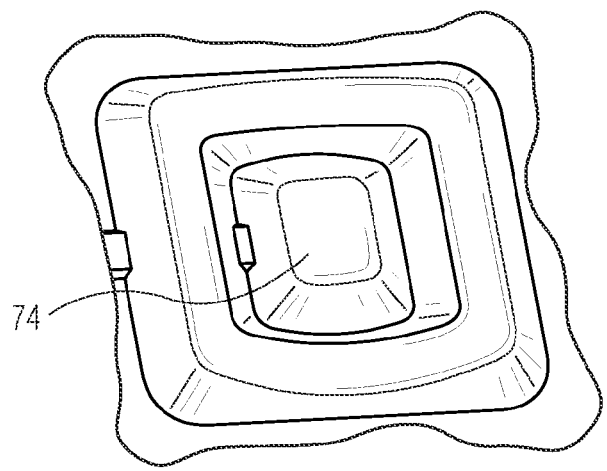
FIGS. 9A-F show examples of key structures with small numbers of interior supports.
Figure 9B:
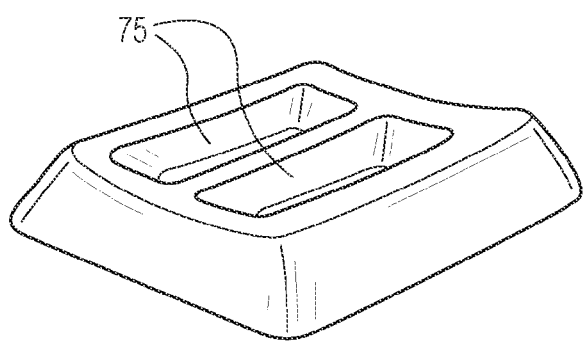
Figure 9C:
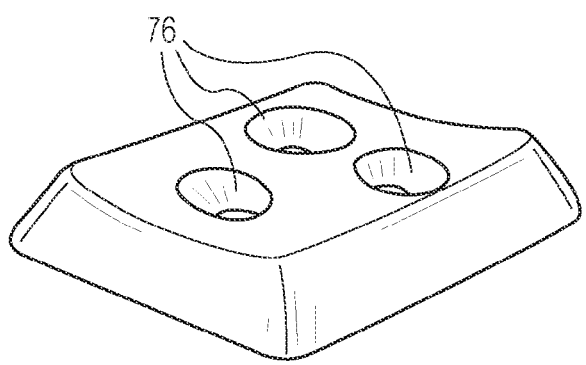
Figure 9D:
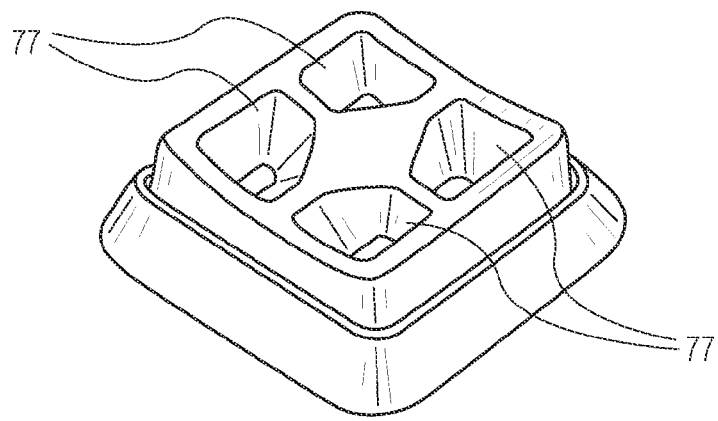
Figure 9E:
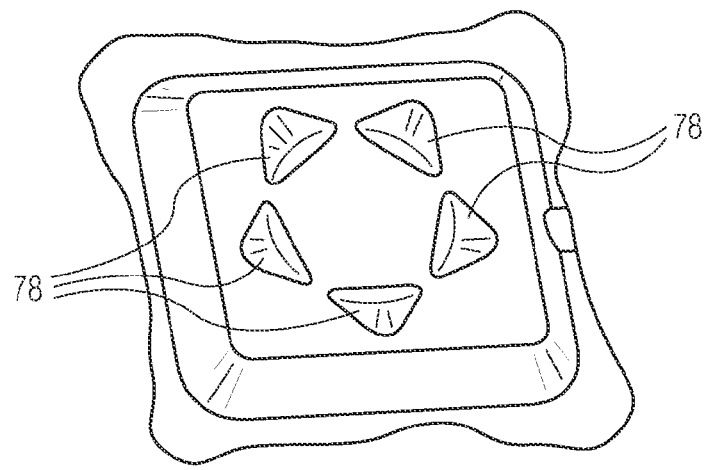
Figure 9F:
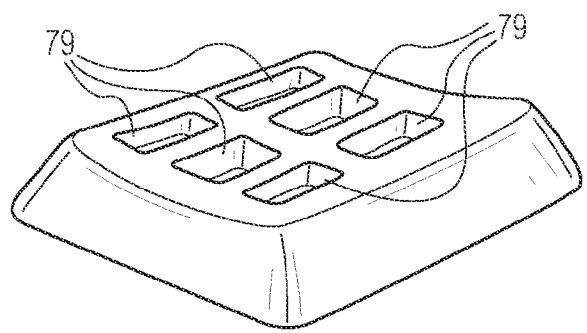
Figure 12:
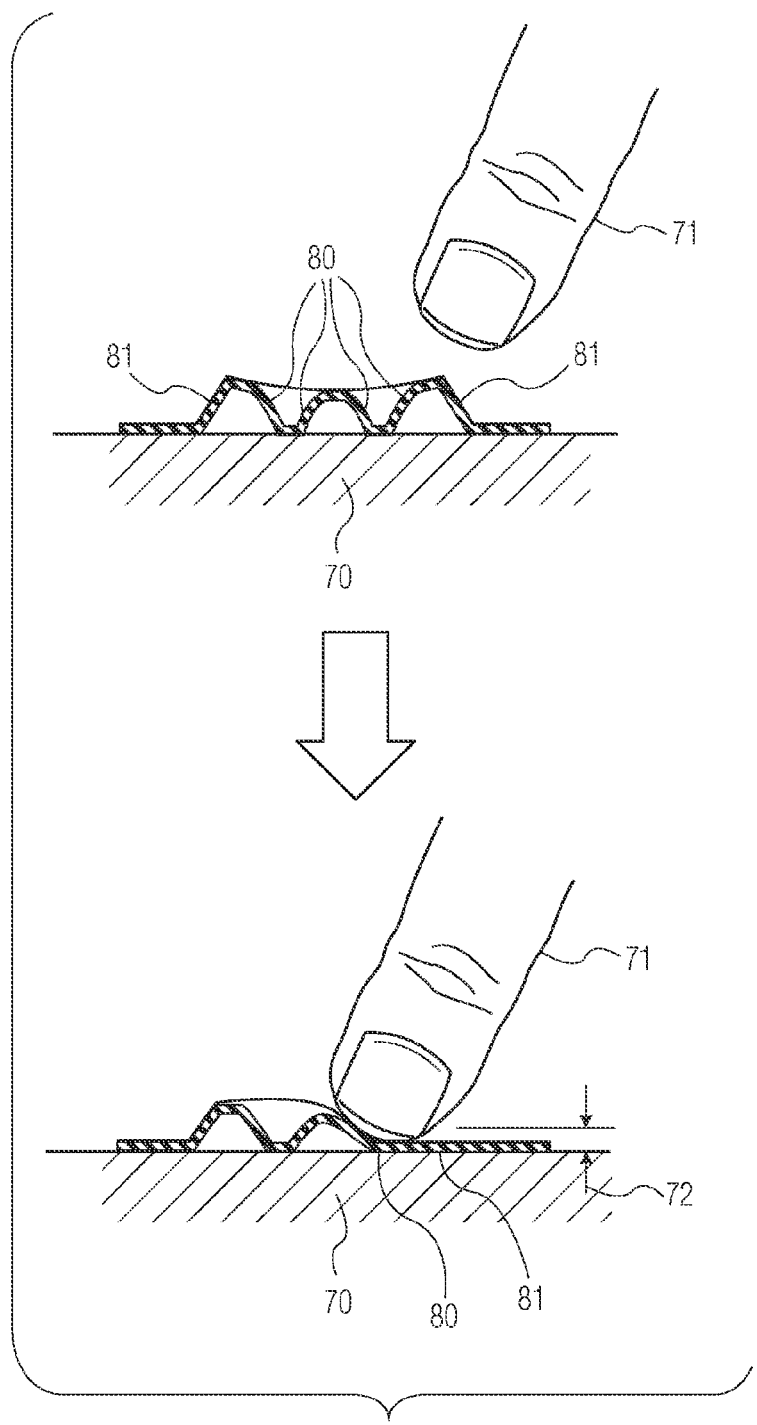
FIG. 12 shows how the outer and interior sidewalls of the key structure properly collapse from a lateral or shallow angle key stroke.

Therefore, the material used in the present invention, eg FIG. 12, must be thin enough to allow the user's finger 71 to land within range 72 of a proximity-based touch screen 70 at the end of a key stroke 73, as shown in FIG. 8. The preferred embodiment of the present invention is to use a material thickness compatible with Pro-Cap touch screen technology, such as that found on the Apple iPAD®, Motorola XOOM®, and other tablet computers. These devices require that the user's finger come to approximately 0.4 mm from the surface of the touch screen in order to trigger the touch screen. Therefore, the preferred embodiment generally utilizes a slightly smaller, material thickness of 0.3 mm, to ensure that key strokes are always recognized. Other touch detection technologies may have different proximity requirements; the present invention can accommodate these differences by adjusting various design parameters including, but not limited to, nominal wall thickness.

In the preferred embodiment, the keyboard overlay is manufactured as a single injection molded, liquid injection molded or compression molded part of a single durometer, since this is the simplest, lowest cost manufacturing approach. However, other embodiments can be created with other manufacturing techniques, using multiple durometer materials and/or mixing dissimilar materials using processes like over-molding, insert-molding, co-molding, multiple shot injection molding and others.

The elastomeric material in the preferred embodiment is optically transparent, so that the user can see the indicia on the underlying virtual keyboard. Other embodiments can use translucent or opaque materials, especially if the underlying virtual keyboard never changes layout or indicia. Variations are also possible that selectively leave transparent windows or zones in the overlay where the user may see through to important indicia.

Another important aspect of the present invention is that it avoids creating "dead zones" in the virtual keyboard area of the touch screen that are a significant fraction of the finger contact area. This is done for all touch typing finger trajectories and all off center strokes that land on any part of a key structure.

In order for a key structure to fulfill all of these requirements with a thin, soft elastomeric material that is inherently structurally weak, a set of interior supports are used in combination with the outer sidewall(s) to create a structure that has the desired resistive force characteristics and force displacement characteristics, regardless of finger trajectory and stroke initial location through the entire length of finger travel. The novel combination of outer sidewalls and interior supports, and the novel corrugated design of the outer sidewalls and interior supports, allows the present invention to be optimized for touch typing.

Figure 10:
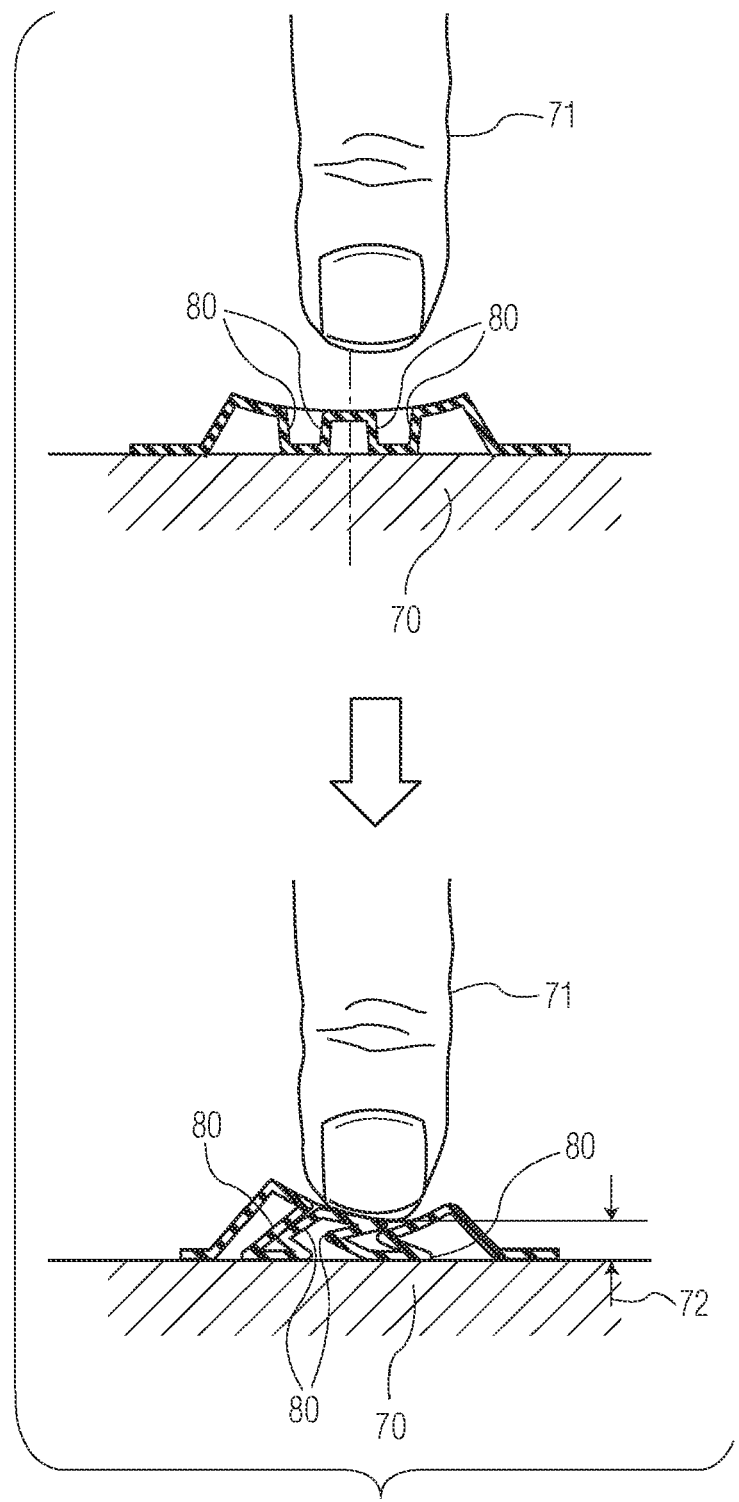
FIGS. 10 and 11 show examples of incorrect outer and interior sidewall buckling that block the user's finger from entering touch screen proximity.
Figure 28:
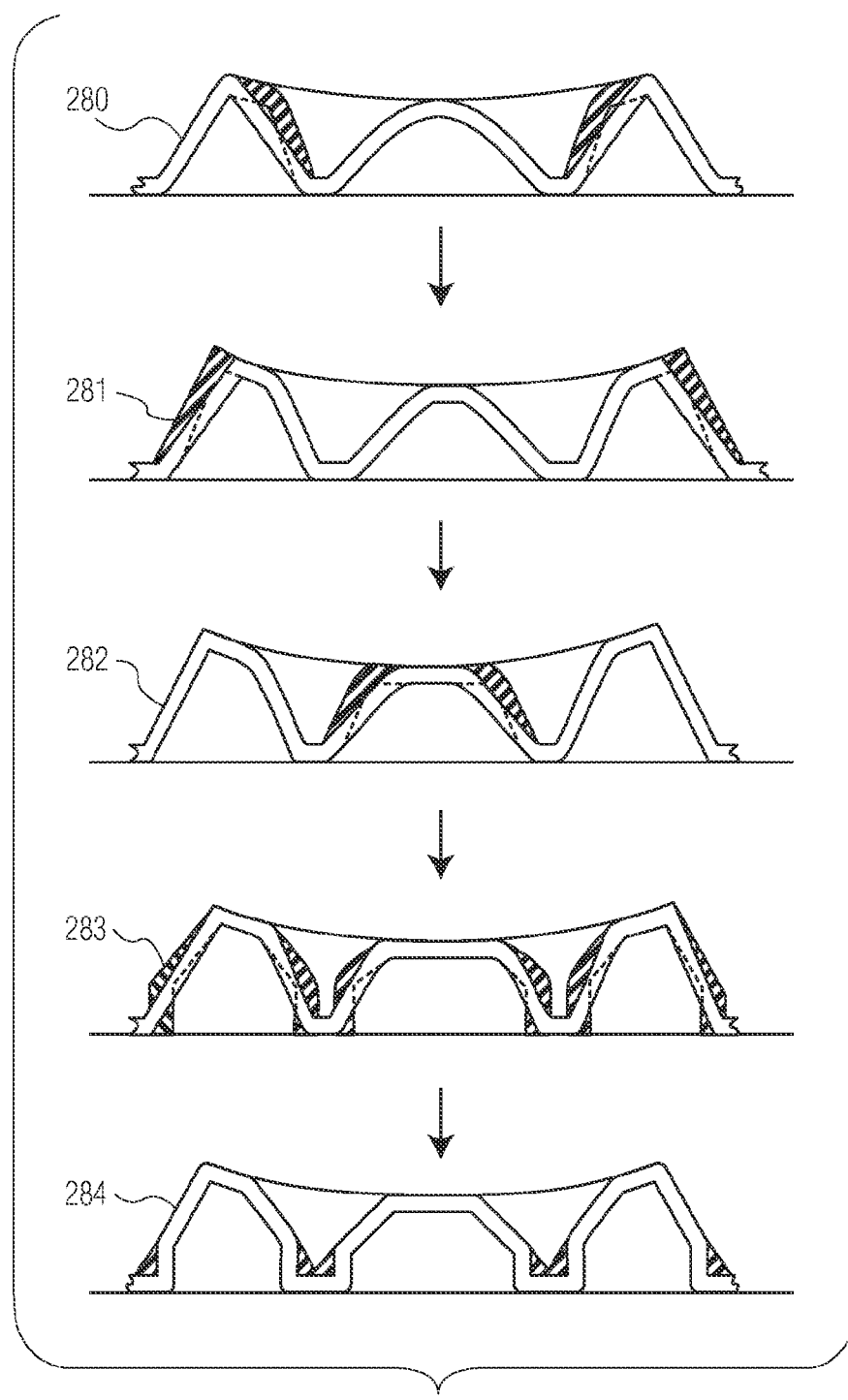
Figure 29A:
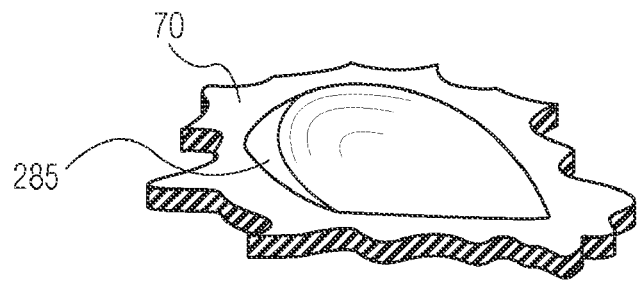
FIGS. 29C-D shows an example of a key structure with one outer sidewall.
Figure 29B:
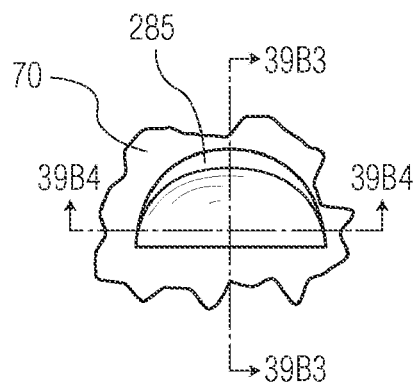
Figure 29C:
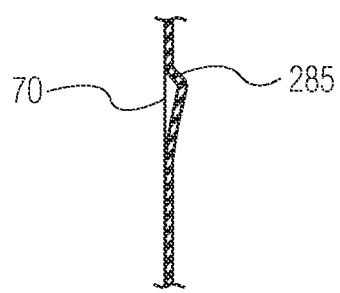
Figure 29D:
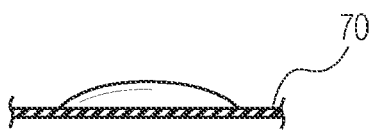
Figure 30A:
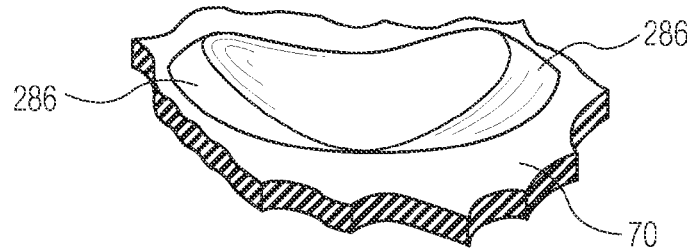
FIG. 30 shows an example of a key structure with two outer sidewalls.
Figure 30B:
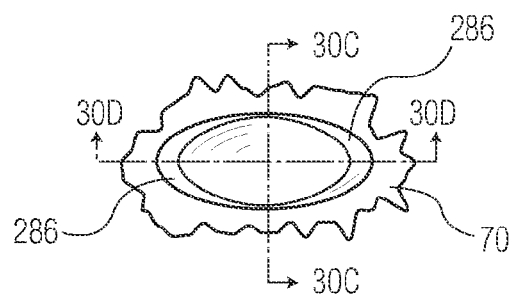
Figure 30C:
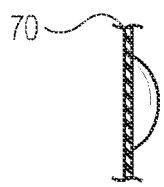
Figure 30D:
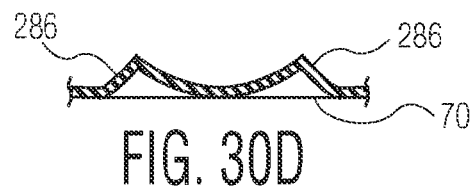

FIG. 28 shows a wide variety of key structure designs that have been produced by the present invention. As can be seen from these examples, the number and geometry of outer sidewalls and interior supports vary greatly. Some key structures have four outer sidewalls, similar to the traditional key top on a mechanical key switch. Other key structures have a single outer sidewall 285, as shown in FIGS. 29A-C. Other key structures have two outer sidewalls 286, as shown in FIGS. 29A-C. Some key structures have no interior supports at all, such as the Direct Key Structure shown in FIG. 32 A-C and discussed further herein. Others have a small number of interior supports, such as the exemplary key structures with one 74, two 75, three 76, four 77, five 78 and six 79 interior supports shown in FIG. 9. And other key structures have a large number of interior supports, as shown by the exemplary key structures in FIG. 10.

It is also possible to incorporate the present invention into a complex, multi-part keyboard overlay assembly, or the key structures could be individually contained or one elastomeric sheet could be constrained within a rigid frame. Alternatively or additionally, each key in the array could include a conductive or nonconductive nib adhered to or otherwise incorporated into the bottoms of the key structures that would trigger proximity-based touch screens or be compatible with the operation of other technologies such as pressure-sensitive touch screens. These nibs could actuate a virtual key directly or by concentrating the force from a distributed fingertip load. The nibs and/or the surrounding keyboard overlay structures could be made of stiff but flexible plastic materials, such as polycarbonate (PC), high impact polystyrene (HIPS), polyethylene (PET) or other suitable engineering materials. These approaches may change some benefits of the invention, but many of its desirable characteristics would remain.

The elastomeric material used in the preferred embodiment has desirable memory, aesthetic, tactile, durability, manufacturability and cost characteristics. However, it has extremely poor structural strength at the thicknesses needed to work properly with a proximity-based touch screen. Key top supporting structures must span individual key areas in the range of 250 $mm^2$ to 400 $mm^2$, as dictated by the general overall plan view dimensions of a typical key on a touch typing keyboard. A simple low travel structure consisting of sidewalls propping up a clear stretch of material will have a force displacement curve that essentially exhibits no significant resistive support at any distance greater than 3 times the wall thickness measured in plan view from said sidewall. This type of structure will have force displacement properties similar to those shown in FIG. 17.

In order to be able to use commercially available elastomeric material, the preferred embodiment of the present invention uses a corrugated design to dramatically increase the strength of structures made from this material. By increasing the number of weight-bearing sidewalls in the structure by including a set of interior supports with their own sidewalls and possibly incorporating corrugated outer sidewalls, many desirable force resistance/displacement curves can be achieved. Other embodiments that use different materials might use other design techniques to achieve these goals.

However, adding interior supports introduces some additional design issues.

Figure 11:
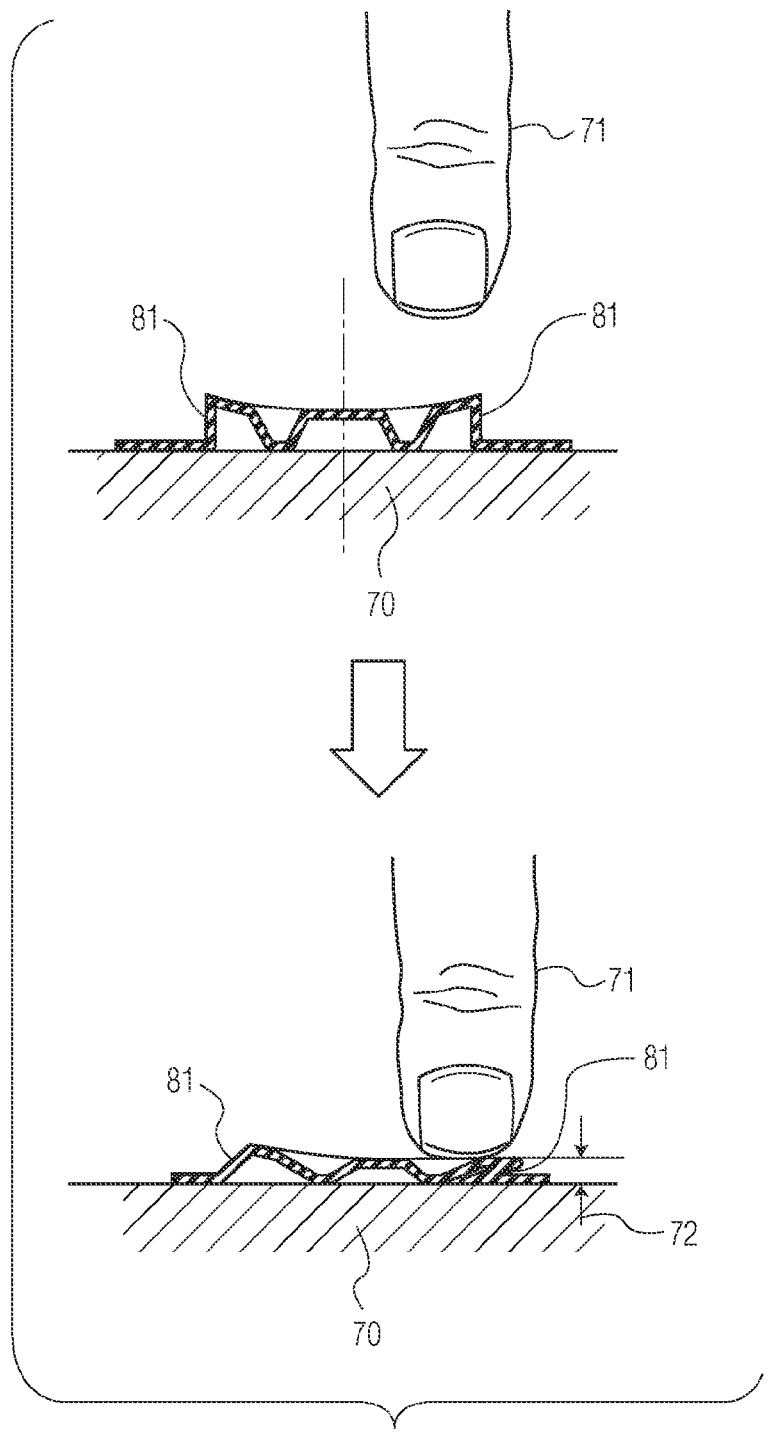

One issue is handling sidewall buckling. Overly vertical sidewalls or sidewalls without local stress inducing scoring will unpredictably buckle under compressive load from a key stroke. Buckling must be carefully controlled to never get in the way of the user's finger reaching the touch screen proximity point. For example, see FIG. 10 which shows the sidewalls of interior support structures 80 buckling incorrectly and folding under each other, blocking the user's finger from entering the touch screen proximity zone 72. Also see FIG. 11, which shows an outer sidewall 81 buckling incorrectly.

Instead, the desired behavior is for sidewalls to always predictably bend under load and allow the user's finger to enter into touch screen proximity range at the end of a key stroke. FIG. 8 shows how the interior sidewalls of this or a similar key properly collapses from a vertical key stroke. The sidewalls fold away from each other and out of the way of the user's finger. At the end of stroke 73, the sidewalls are roughly "flattened out" or approximately parallel to the touch screen surface in proximity to the fingertip.

A properly designed key structure handles all touch typing finger trajectories properly. While traditional constrained key plunger mechanisms found in mechanical key switches redirect lateral trajectory motions to vertical, thin walled elastomeric keys are not constrained to vertical motion. As described herein, the virtual keyboard software is designed to properly handle a key stroke that occurs on any location of the virtual keyboard, even portions of a key neighboring the target key, regardless of finger trajectory. Therefore, key structures must handle key strokes landing on any part of the overlay and from any direction. Even key strokes that land on two or more key structures (and/or their underlying virtual keys) or between keys must allow the fingertip to reach the proximity detection distance (actuation distance) at end of stroke. FIG. 12 shows how this key structure's outer 81 and interior 80 sidewalls collapses when a lateral angle (aka shallow trajectory) key stroke is applied. The sidewalls are again roughly "flattened out" in proximity to the fingertip at the end of the key stroke.

A non-obvious benefit of not redirecting lateral trajectories to vertical is that when designed properly, a thin walled elastomeric key structure will provide a lower distance stroke to actuation for lateral key strokes than a mechanical key switch. Additionally, properly designed elastomeric key structures will help to decelerate the inbound finger and provide spring back along all trajectories, not just vertically.

Figure 13A:
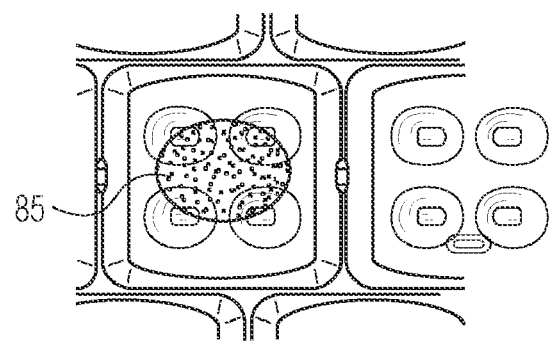
FIG. 13A shows how there are at least three key structure walls underneath an on-center finger location, thereby providing sufficient resting resistance.
Figure 13B:
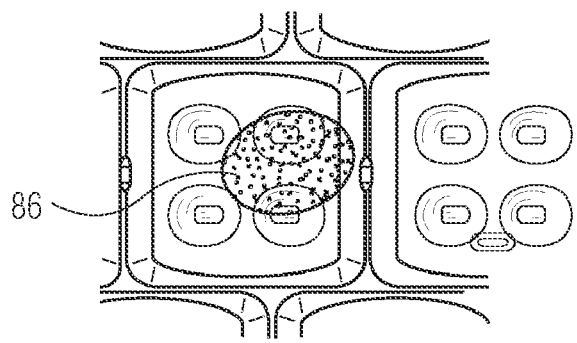
FIGS. 13B and 13C show how there are at least three key structure walls underneath off-center finger locations as well.
Figure 13C:
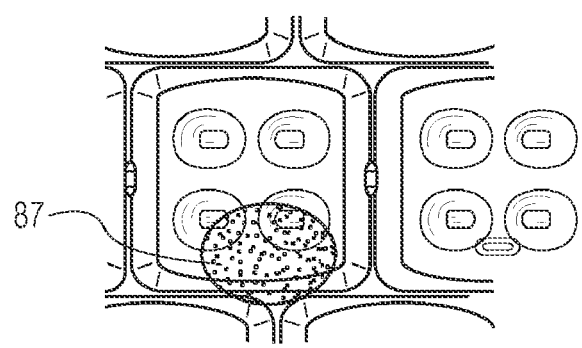

Key structures must provide sufficient resting resistive force. The present invention ensures that there are sufficient and well-distributed interior supports and outer walls to effectively support fingertips resting on all possible key top locations. FIG. 13A illustrates an on-center finger location 85 on a key structure and FIGS. 13B and 13C illustrate two different off-center finger locations 86, 87 on the same key structure. Note that for all of these finger locations at least three sidewalls are engaged, thereby providing adequate finger resting support.

Sidewalls can also be effectively implemented in non-uniform material thicknesses, or with other non-uniform material properties such as durometer, elasticity, etc. or designed with corrugated structures. In the case of non-uniform material thickness, selected portions of the key structure are thicker than the proximity detection zone distance and thicker than the nominal key structure wall thickness. As shown herein, this can be done in a manner that avoids creating "dead-zones" that are of a significant fraction of the finger contact area. The preferred embodiment for these types of sidewalls is to make them thicker at the bases of walls—the opposite configuration to traditional elastomeric key pad button design, where the base is thin and the key top "body" is thicker or harder. Key structures utilizing outer and interior sidewalls of non-uniform wall thicknesses provide stiffer sections and higher initial resistive forces than otherwise equivalent uniform wall thickness geometries. They can also render the folding dynamics more predictable acting as local stress risers that cause non-linear resistive force rate changes where none would have occurred otherwise.

Figure 14:
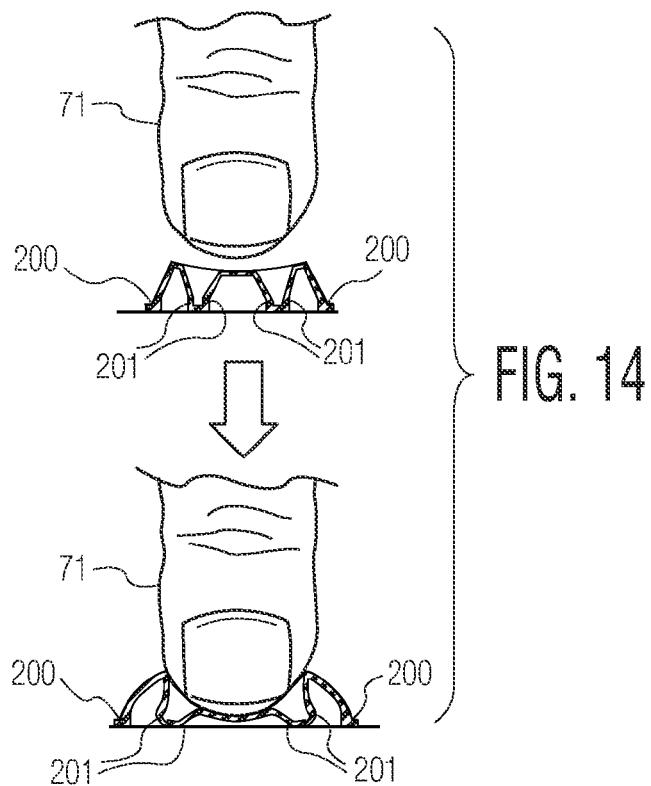
FIG. 14 shows an example of a key structure with don-uniform wall thickness deforming out of the way during a vertical key stroke.
Figure 15:
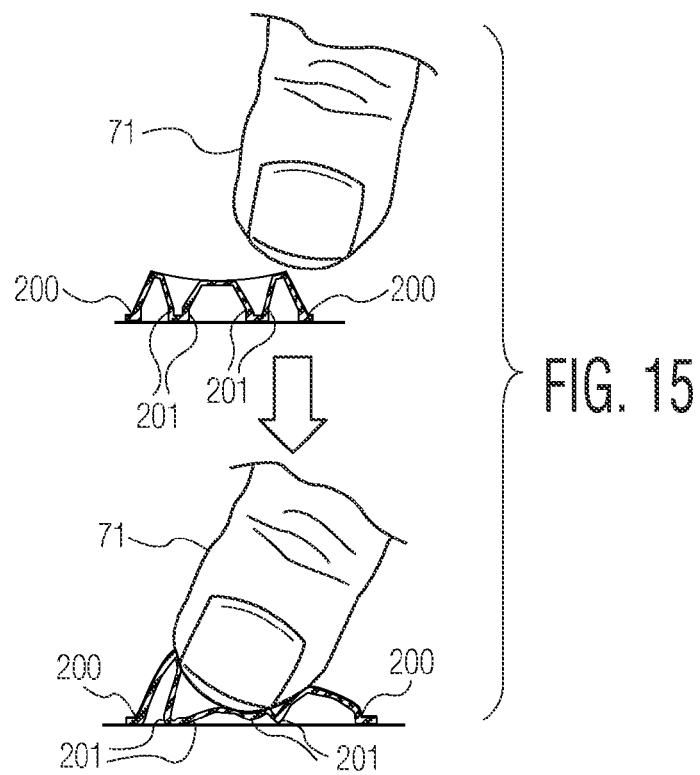
FIG. 15 shows an example of a key structure with non-uniform wall thickness deforming out of the way during a lateral key stroke.

FIGS. 14 and 15 show an example of a non-uniform wall thickness key structure with thicker sections at the base of each of its outer 200 and interior 201 sidewalls. It is designed so that the thicker sections deflect out of the way of user's fingertips during and at the end of both vertical (FIG. 14) and lateral or off-center (FIG. 15) key strokes.

Figure 16A:
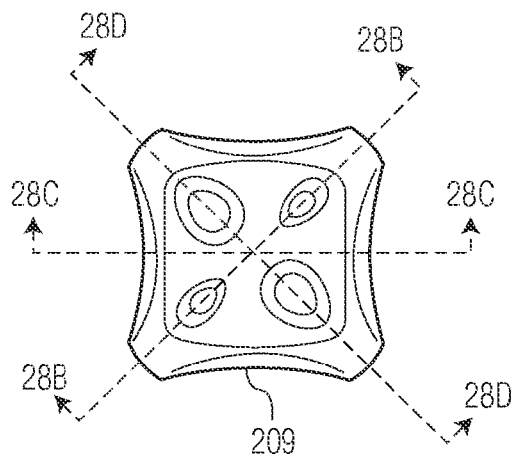
Figure 16B:
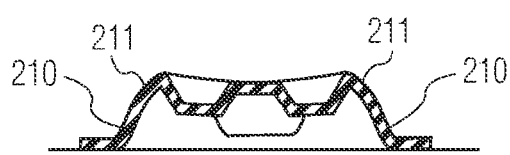
Figure 16C:
Figure 16D:
Figure 17:
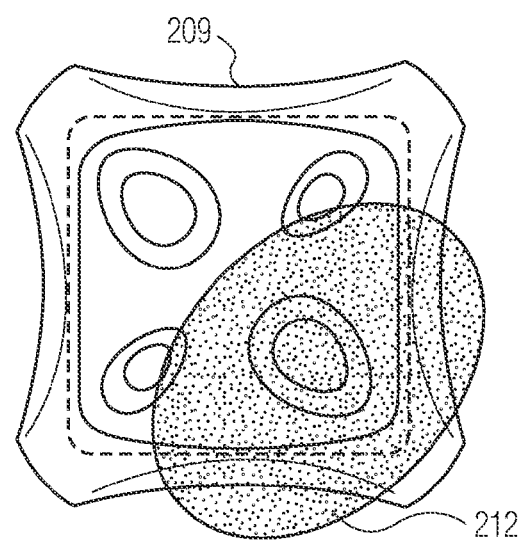
Figure 18:
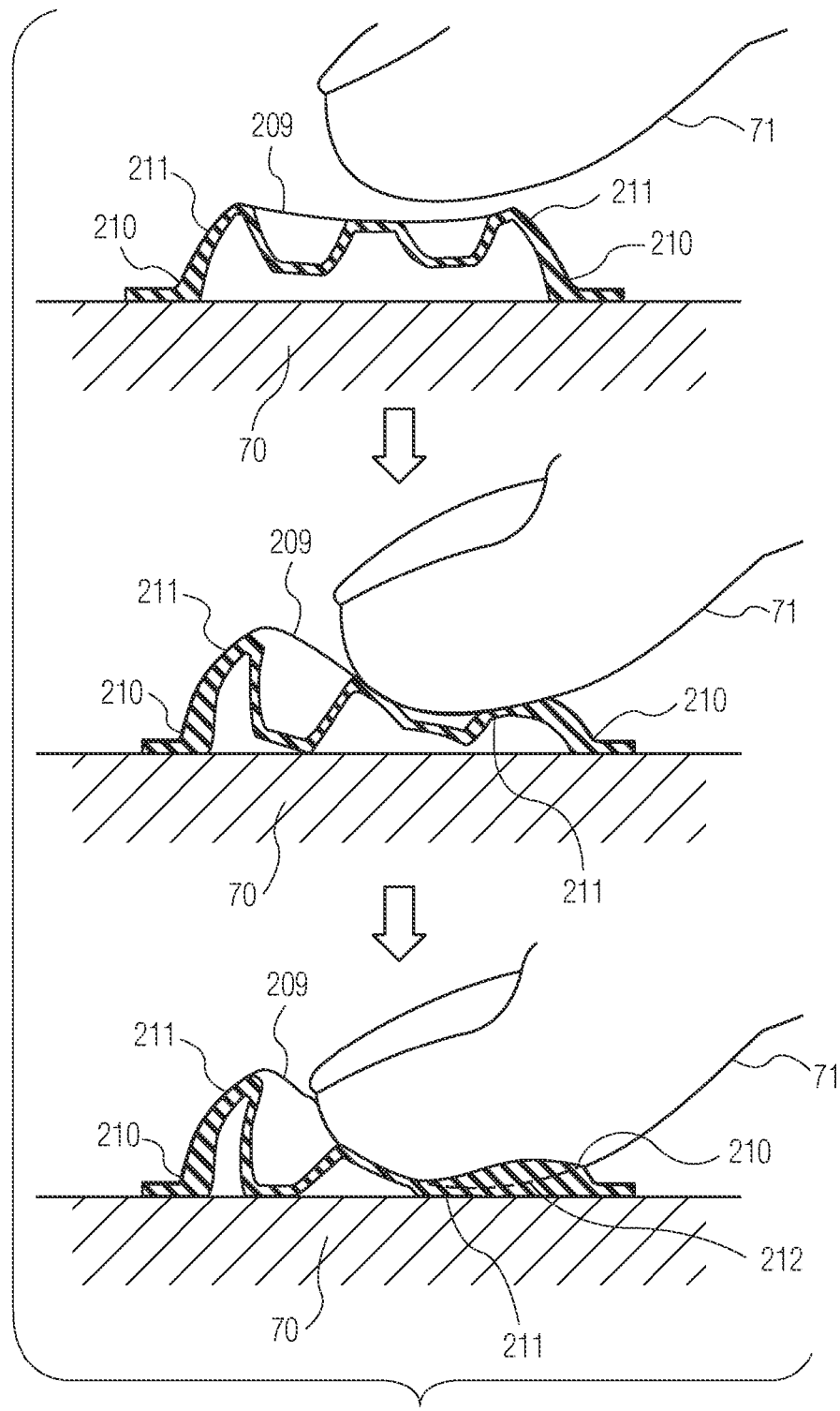
FIG. 18 shows an example of a non-uniform wall thickness key structure that always registers a recognizable finger shape on the touch screen; the location of an example off-center key stroke on the key structure; and how the key structure deforms from a key stroke.
Figure 19:
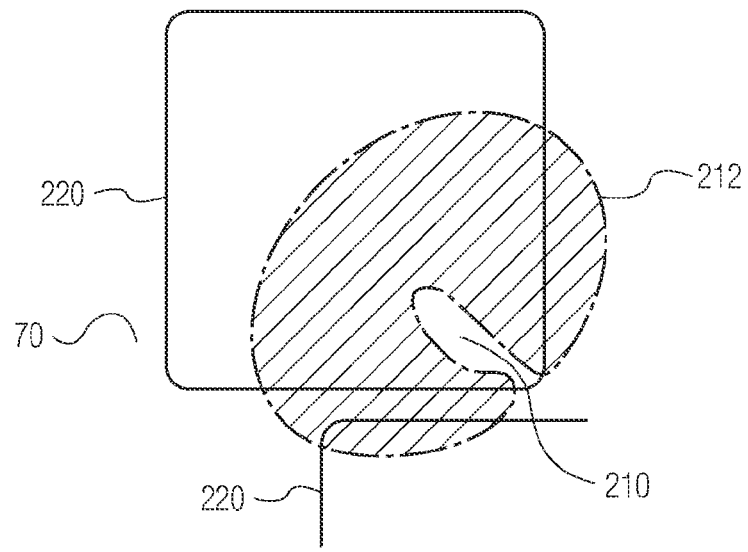
FIG. 19 illustrates how the key stroke shown in FIG. 18 registers on a proximity-based touch screen

Another approach to avoiding "dead-zones" that are a significant fraction of the finger contact area in a non-uniform wall thickness key structure is to design the size and shape of the thicker region so that the user's finger will always register a recognizable finger shape on the touch screen for all touch typing finger trajectories even if the thicker key sections do end up under the finger tip. An example of such a key structure 209 is shown in FIG. 16A. The structure is mostly made up of uniformly thin zones. However, when viewing sections taken through the plan view corners of the part, (the noted sections run along the diagonals of the plan view rectangle of the key structure) it becomes apparent that the local bases of the side walls 210 have been made substantially thicker than the rest of the structure. The four local corner outer sidewalls gradually taper down in thickness until they reach the nominal thickness of the part as they intersect the underside (ceiling) corners of the key top 211. FIG. 17 shows an example location of an off-center key stroke 212 onto the key structure 209 in FIG. 16A, striking a corner. FIG. 18 shows how the key structure 209 deforms as the user's finger 71 travels through this key stroke. Note that in this example much of the user's finger overlaps the thicker portion 210 of the key structure at the bottom of the stroke 212. FIG. 19 illustrates how this key stroke registers on a proximity-based touch screen. Touch screen and virtual keyboard 220 finger recognition software recognizes the edges of the distinct oval shape made by a finger 212. The edges of this oval shape are still registered on the touch screen 70, even though there is a small area of the user's finger that did not register because it was out of proximity range due to the small thicker area of the key structure 210. Finger recognition software focuses on recognizing the edges of an oval 212 and ignores these sorts of small discrepancies, since they routinely occur for a variety of reasons such as dirt on the touch screen surface, electrical interference, etc.

A similar approach enables a small portion of a key structure to fold over itself during a key stroke to create a local thick zone that does not create a "dead-zone" that is a significant fraction of the finger contact area. The folded over region must be small enough so that all touch typing finger trajectories that intersect with it still register a shape on the touch screen that is correctly recognized as a finger touch by the finger recognition software.

The key structures in the present invention are designed to achieve desired resistive force displacement curves along forward (striking the key) and return (releasing the key) finger strokes. Sidewalls may be used individually or in tandem to shape these curves. Non-uniform (thickness and surface discontinuity) sidewall geometries can also play an important role, since they allow for resistance, bending and localized stress induced bending, deforming or buckling behavior to be designed into specific points along the force curve.

Figure 3:
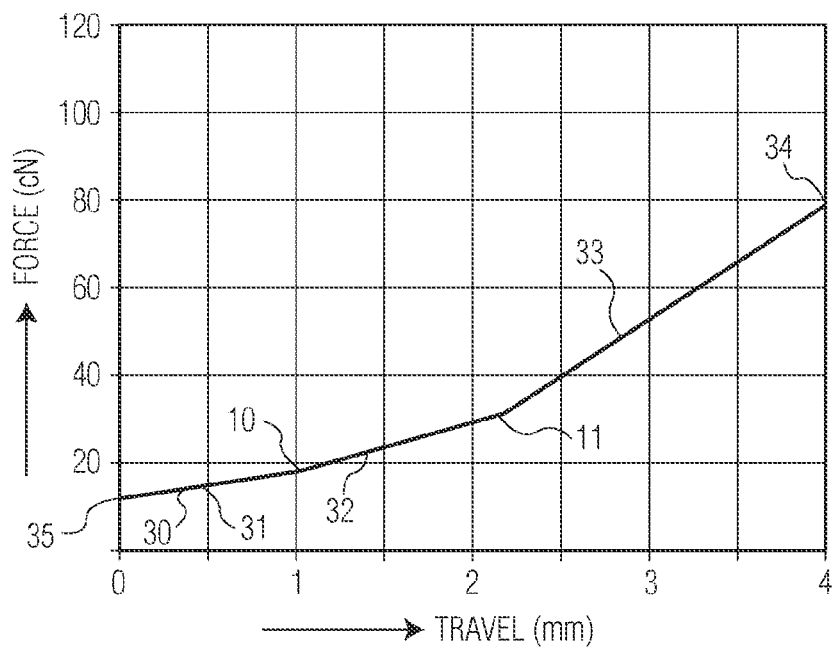
FIG. 3 shows a graduated linear force displacement curve, where the slope increases in stages, for a mechanical key switch used for touch typing.
Figure 20:
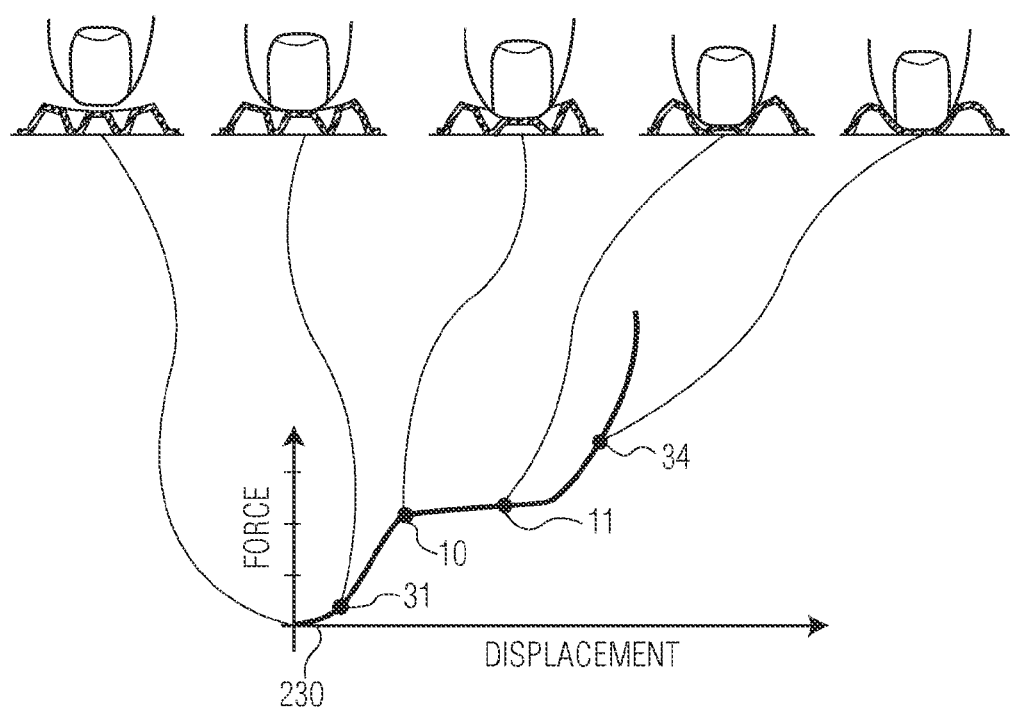
FIG. 20 shows the forward (downward) force displacement curve for the uniform wall thickness key structure.
Figure 21:
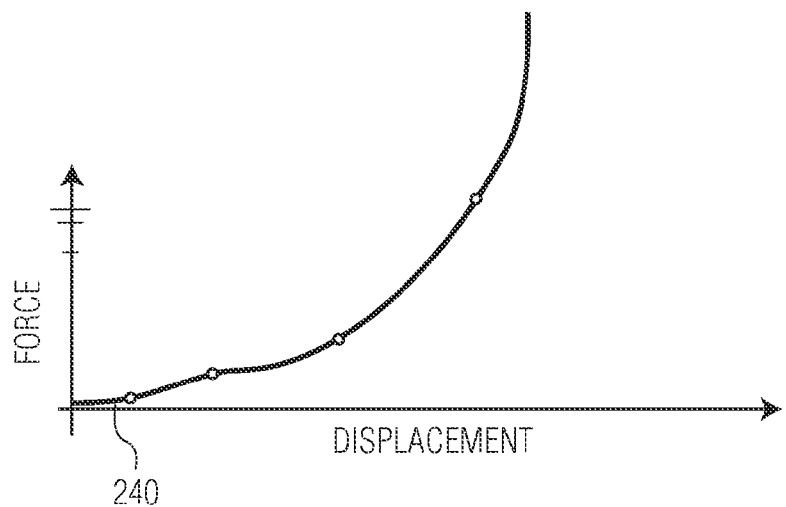
FIG. 21 shows the reverse (upward) force displacement curve for the uniform wall thickness key structure.

The force displacement curves of three different key structures show how different geometries achieve different curves. FIG. 20 shows the forward force displacement curve 230 for the uniform wall thickness key structure. Note that this force displacement curve is generally similar to the force displacement curve 30 shown in FIG. 3. FIG. 21 shows the reverse force displacement curve 240 for this key structure.

Figure 4:
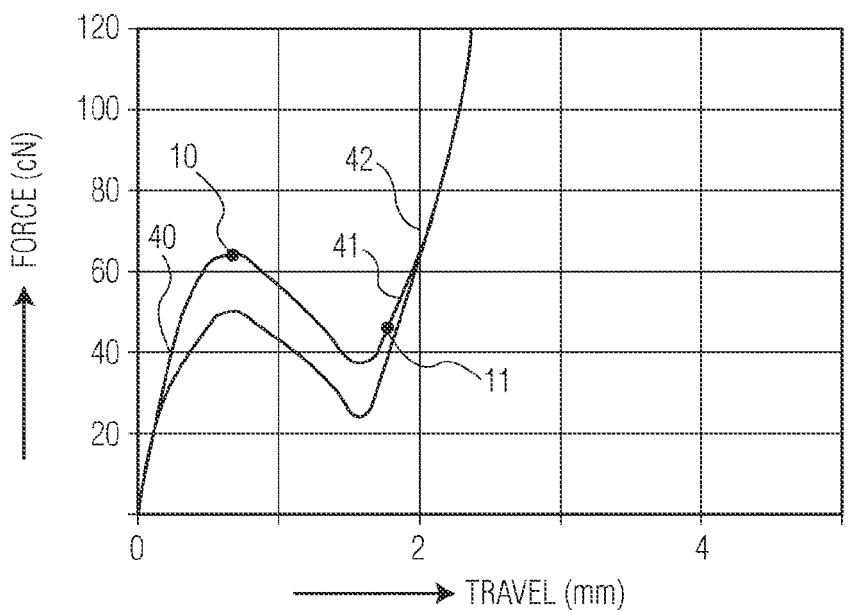
FIG. 4 shows the force displacement curve of a representative rubber dome scissor switch, typically used for touch typing in laptop computers.
Figure 5A:
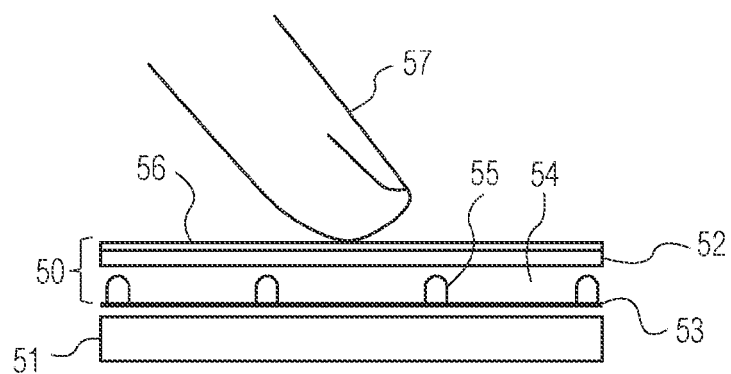
FIGS. 5A, 5B and 5C are a sequence showing an analog resistive touch screen being actuated.
Figure 5B:
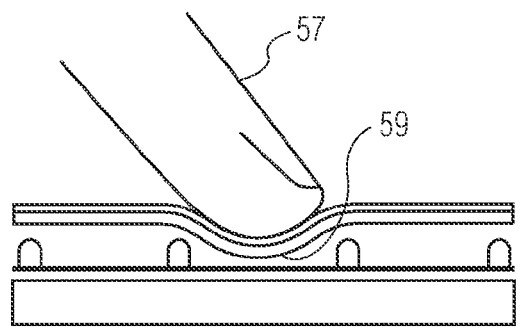
Figure 5C:
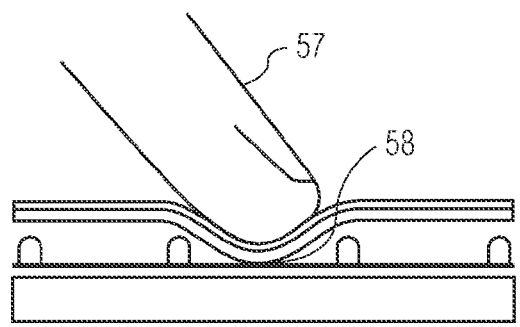
Figure 22:
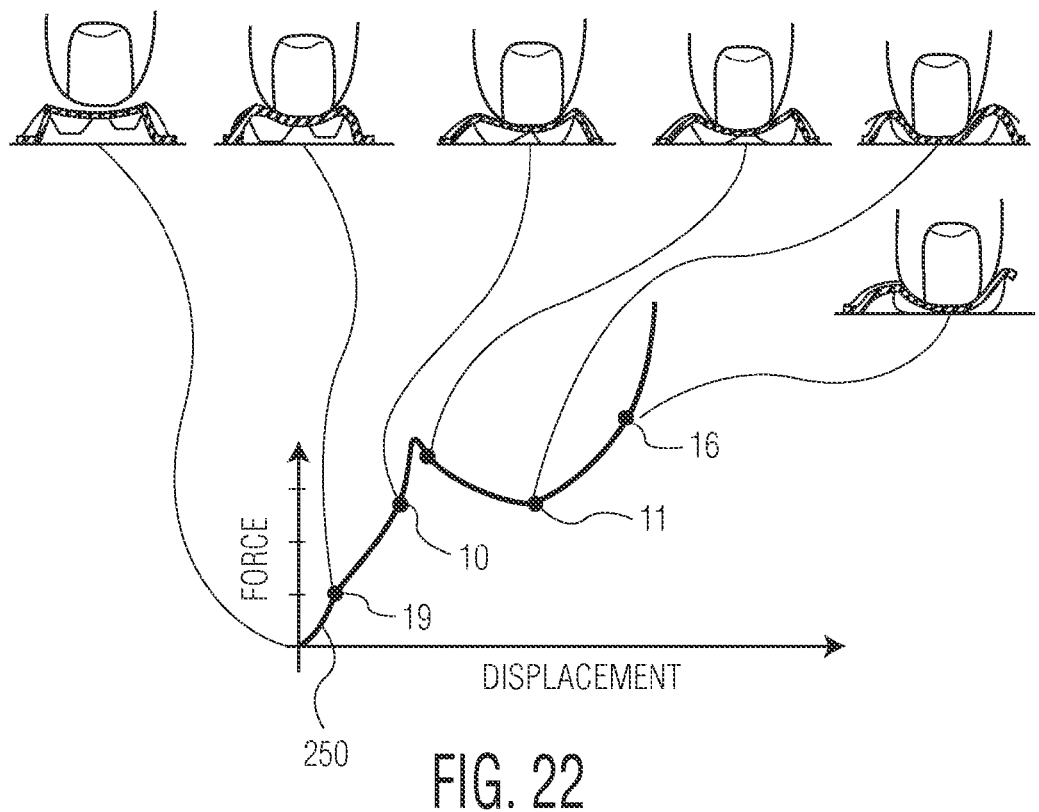
FIG. 22 shows the forward (downward) force displacement curve for the key structure in FIG. 16C.
Figure 23:
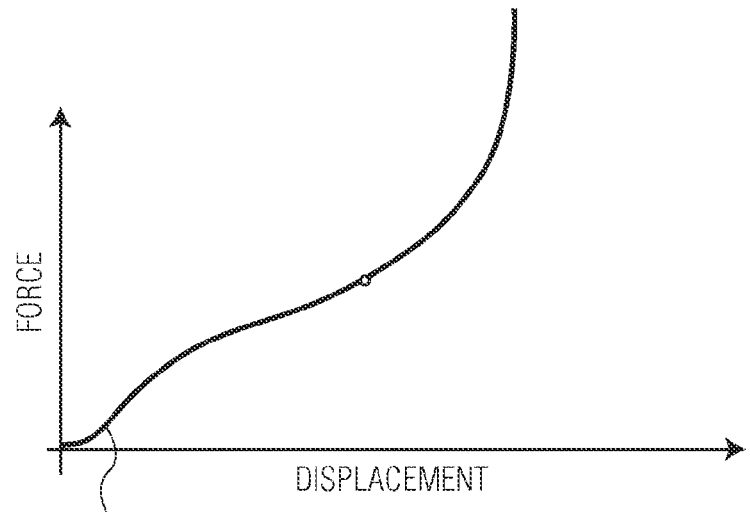
FIG. 23 shows the reverse (upward) force displacement curve for the key structure in FIG. 16C.

FIG. 16 shows a section view of a key structure with non-uniform wall thicknesses and two pairs of interior supports of differing heights from the base surface of the key. FIG. 22 shows the forward force displacement curve 250 for this key structure. Note that the force displacement curve is generally similar to the force displacement curve shown in FIG. 4. FIG. 23 shows the reverse force displacement curve 260 for this key structure.

Figure 24A:
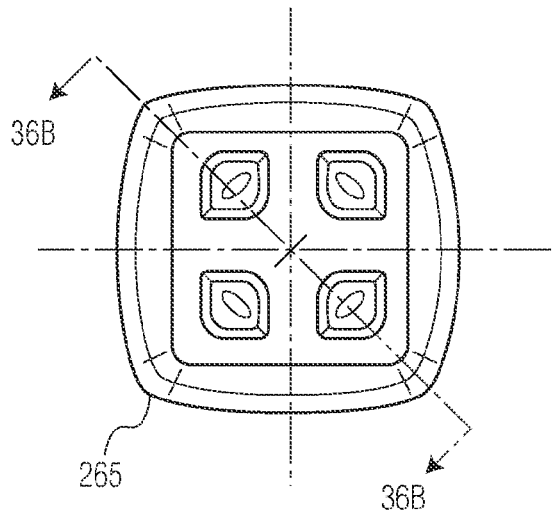
FIGS. 24A and B show isometric and section views of a key structure with non-uniform wall thickness, two pair of interior supports with bent sidewalls, and outer bent sidewalls with local thin zone "scoring" that initiate bending collapse in predictable locations.
Figure 24B:
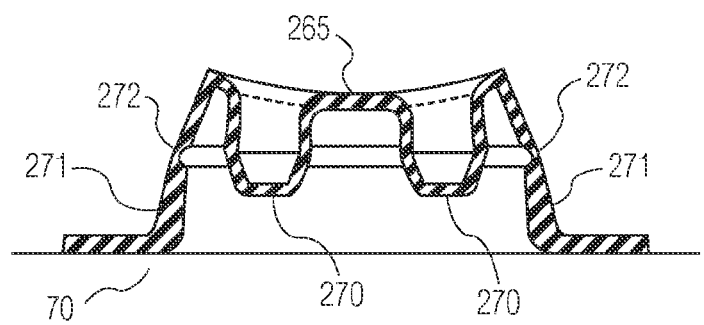
Figure 25:
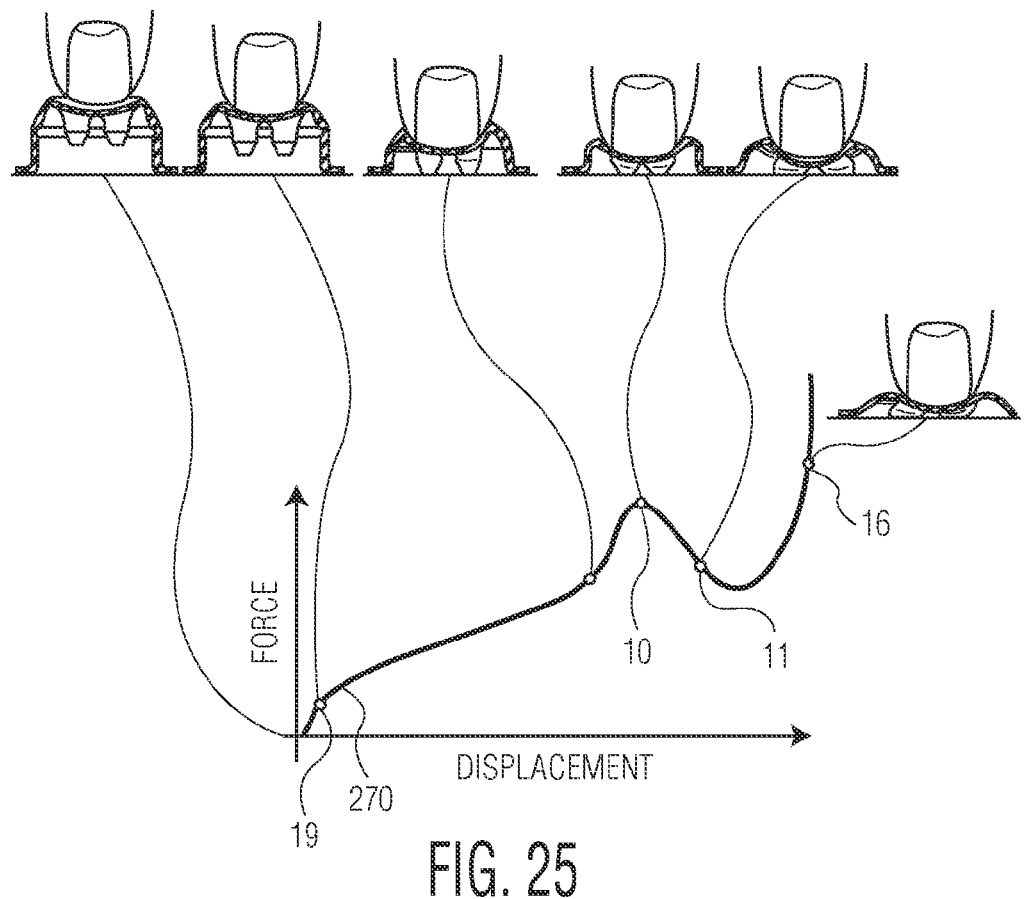
FIG. 25 shows the forward force displacement curve for the key structure in FIG. 36.
Figure 26:
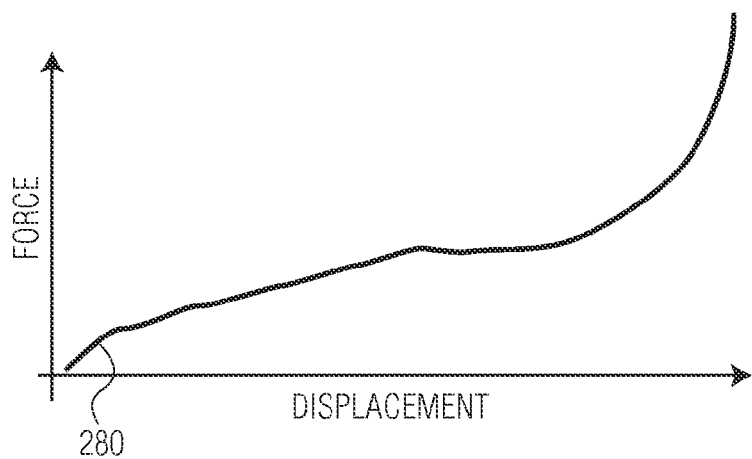
FIG. 26 shows the reverse force displacement curve for the key structure in FIG. 36.
Figure 27:
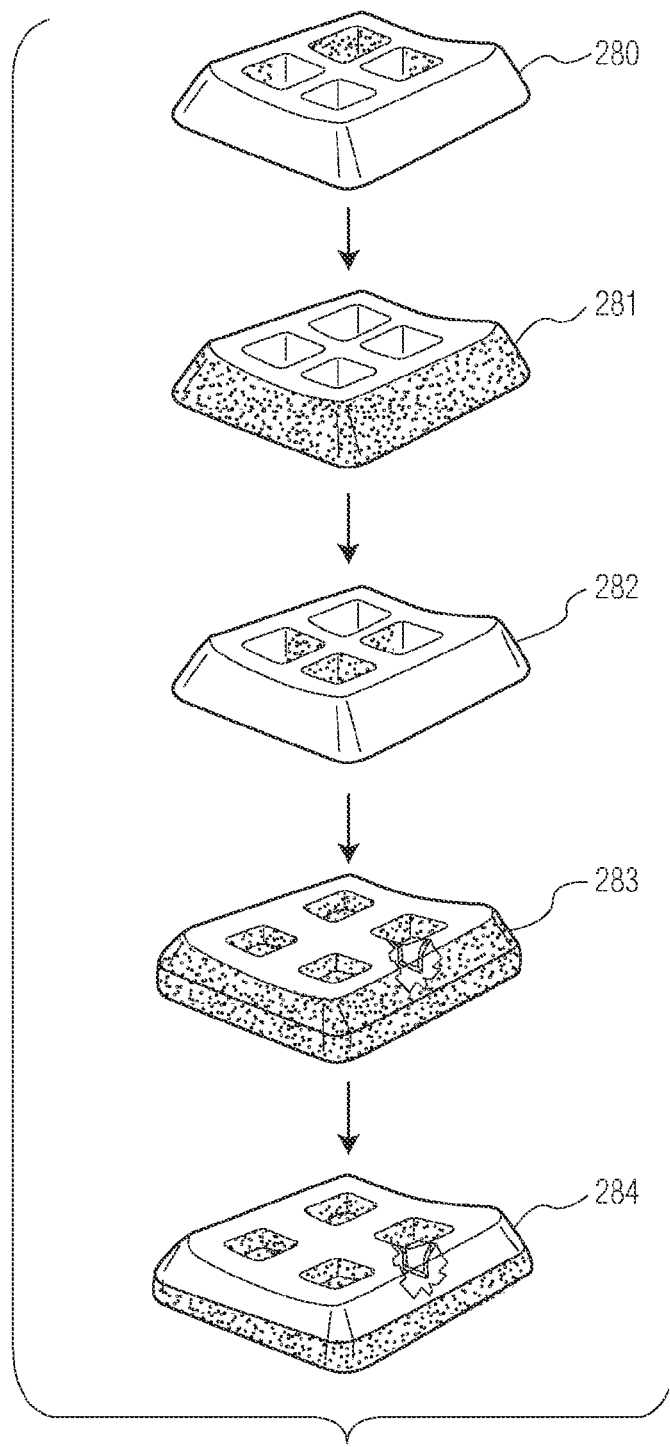
FIGS. 27 and 28 show examples of other non-uniform thickness and bent or corrugated outer and interior sidewall geometries.

FIG. 24B shows a section view of a key structure 265 with non-uniform wall thicknesses, two pair of interior supports with bent sidewalls 270 and with outer sidewalls 271 that have a local thin zone 272 (less than the nominal wall thickness) used to initiate bending in a predictable location. Note that this key structure stands relatively higher off the base surface than previous examples. FIG. 25 shows the forward force displacement curve 270 for this key structure and FIG. 26 shows the reverse force displacement curve 280 for this key structure. Note that these force displacement curves exhibit long key travel, a high degree of resting resistance and significant pre-actuation cueing. It is generally similar to the force displacement curve shown in FIG. 1, but with an actuation point in an appropriate location for touch screen input. In this example the outer side walls 271 provide all of the rest resistive support force. When the interior supports 270 initially floating above the touch screen surface 70 reach the surface of the touch screen glass, extra support is provided which increases the resistive force rate. When the bent sidewalls of the interior supports 270 deform, the resistive force suddenly decreases providing pre-actuation cueing.

Figure 39:
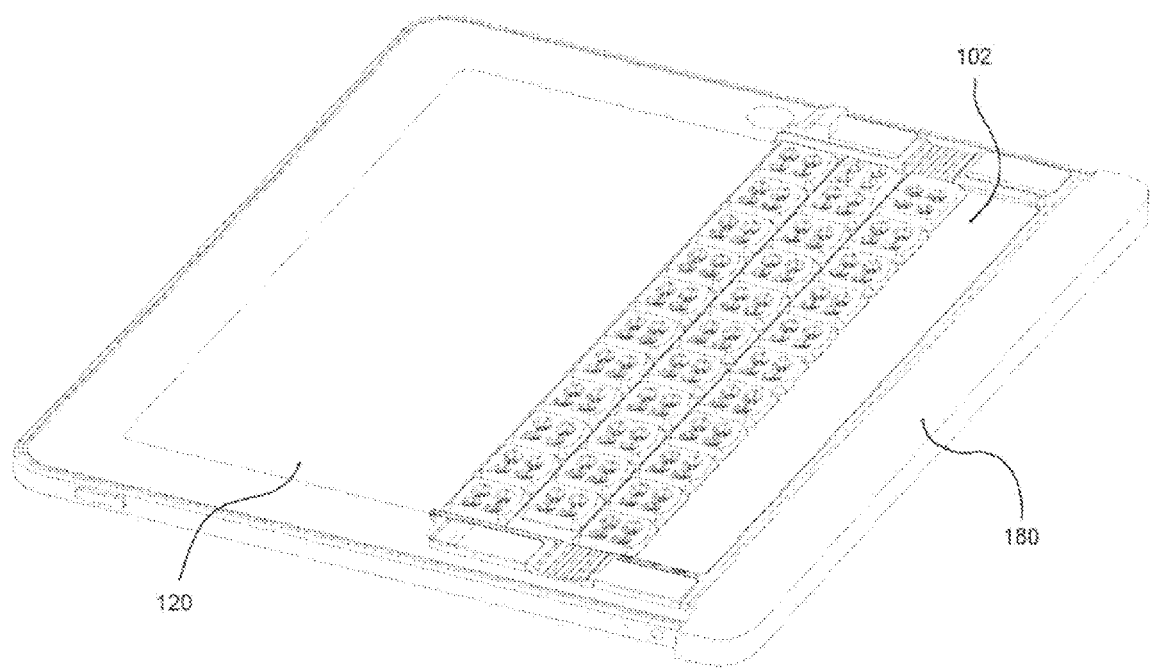
FIG. 39 shows a deployment perimeter incorporated into a removable sleeve 180 that fits onto a tablet computer.

Many other sidewall geometries that utilize surface discontinuities and non-uniform wall thicknesses (both substantially thicker and substantially thinner than the part's nominal wall thickness) to achieve specific force curve results are possible. Examples of several of these geometries and how the geometries may be adjusted are shown in FIG. 39a—steepened wall 8 places 280, steepened wall 4 places 281, steepened wall 8 places 282, modified sidewall geometry 40 places 283, thickened surface extension 20 places 284.

Another characteristic of these key structures is that they can potentially exhibit variations in their force displacement curves depending on what part of the key structure the user's finger presses against, or the angle of the finger when it strikes the key structure. This characteristic can be used to accommodate different usage models for the same key structure. For example, a home row rest key structure can provide significant resting resistance for vertical and near-vertical finger trajectories, while at the same time provide almost no resistance for lateral finger trajectories since it is not needed. This would be useful on a keyboard overlay with identical key structures at all key positions.

Another consideration in the effective design of key structures is the "feel" of the key top. Users are accustomed to smooth key surfaces on touch typing keyboards; so the preferred embodiment must come as close to this as practicable. Fingertips are more sensitive to abrupt changes than to gradual surface changes. Therefore, the transitions from the keytop surface to the inner support side walls have rounded or shallow angle chamfered edges when possible; the greater the blend radii of these edges, the smoother the transition. Radii and 45 degree symmetric chamfers ranging from 0.3 mm to 3 mm are practical in many embodiments, though are, by no means all encompassing.

Figure 6:
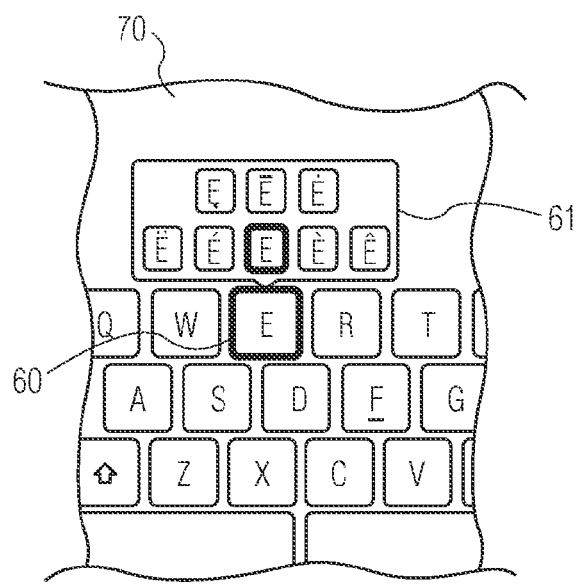
FIG. 6 shows a menu from a virtual keyboard that can only be accessed by holding down for a period of time to bring the menu up and then sliding a finger to the menu.
Figure 7:
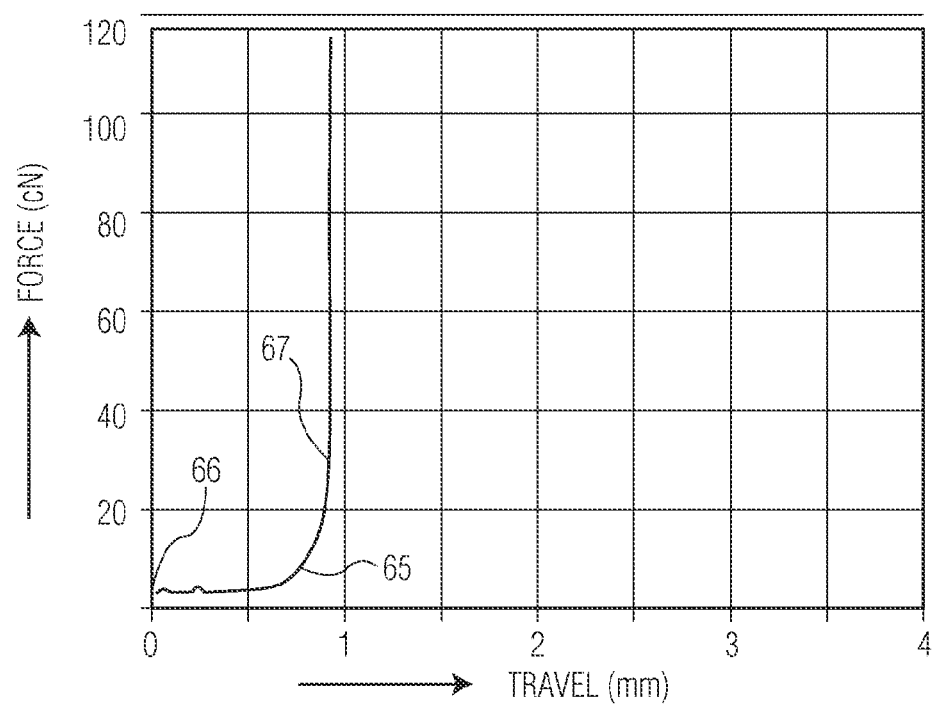
FIG. 7 shows a representative force displacement curve for prior art keyboard overlays.

Key structures must also be designed to allow the user to interact with the touch screen device by actuating a key and, while continuously holding it "down" (actuated) and sliding or dragging the fingertip across multiple key structures. In fact, virtual keyboards sometimes use sliding gestures themselves, as shown in FIG. 6. In order to accomplish this, the key structures in the present invention collapse completely onto the surface of the touch screen, keeping the fingertip within proximity actuation range while sliding pressure is applied. In the case of non-uniform wall thickness solutions with local thick zones greater than the proximity detection distance (actuation distance), said thick zones are arranged in such a way as to not interrupt the actuated "hold down" as the finger slides to other targets.

The tops of the key structures in the preferred embodiment are dished (concave). This dishing provides users with a pleasant cupping feeling around their fingertips when they use the keyboard overlay. However, other key structure embodiments can have flat or convex key top surfaces.

One significant benefit of a keyboard overlay is that the user is given the ability to locate key structures tactilely instead of visually. Prior art keyboard overlays have described various mechanisms for doing so, such as ridges, bumps, etc. However, these mechanisms are detrimental to a keyboard overlay designed for touch typing on proximity-based touch screen, since they invariably require significantly thickened areas of the key structure in order to provide the specified tactile feature, consequently creating local "dead zones".

Figure 31:
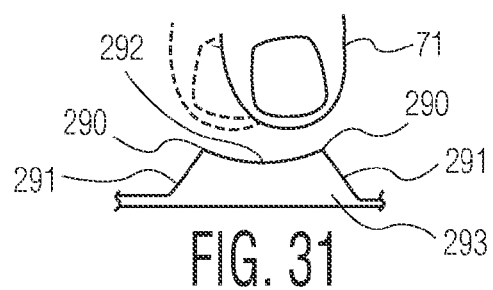
FIG. 31 shows an example of a sharp edge as a natural part of a key structure design.

A better approach for tactile location of key structures on a keyboard overlay is to use sharp edges as a natural part of a uniform thickness key structure design. A sharp edge is formed when the edge formed by the intersection of the outer sidewall 291 and the key top 292 of a key structure 293 carries a blend radius of less than approximately 0.5 mm 290, as shown in FIG. 31. People's fingertips are highly sensitive to edges of this sort; thus, these sharp edges provide an optimal method for tactile detection of key structure location. This approach works well with proximity-based touch screens, since there is no need to add additional thick features to the underlying key structure. Sharper corners generally also add stiffness to the structural system, translating to greater resistive support—usually a desired attribute.

One embodiment of this approach is to shape the tops of the key structures cylindrically 292; the central axis of the cylinder runs in a north-south direction; and then leaving sharp edges 290 on the east-west sides (where an outer sidewall 291 intersects the key top surface 292) of each key structure, as shown in FIG. 31. This figure shows the Northern elevation (viewing to the South) of a key structure with sharp edges on its East-West intersection edges. This aspect of key structure geometry allows the user to have unimpaired north-south access to keys above and below the home row, while at the same time being able to subliminally feel the lateral edges of each key structure as they touch type.

Another beneficial approach to the tactile location of key structures that is consistent with the current invention is for the home row rest key structures to be higher than the other key structures on a keyboard overlay, or for the key top surface of the home row rest keys to have a different tactile "feel" than the other key structures on the keyboard overlay. This allows the user to easily find the proper location for all home row fingers resting on the keyboard overlay.

A frequently used tactile location aid on mechanical keyboards is to mold a small, solid bump on the key tops of two reference keys, typically the "F" and "J" keys on a QWERTY keyboard. Prior art keyboard overlays have also mentioned using the same technique. As stated previously, this approach will not work well with a proximity-based touch screen since it introduces a local "dead-zone". However, using the structural techniques of the present invention, it is possible to create these bumps as thin, hollowed-out features that will not form "dead-zones". They will still be felt by users when they brush their fingers across the tops of the key structures, but when the user performs a key stroke on the key structure, the bumps will "flatten-out" in the same manner as the other uniform wall thickness structures in the present invention.

The home row rest key structures must provide enough initial resistive force to allow the typist to comfortably rest their fingers on these keys. However, all the other key structures do not have to provide this initial resting force. This provides an opportunity to make these key structures faster and more responsive by significantly reducing or eliminating initial rest support force all together. Since there is no initial rest force to overcome during the first part of the force displacement curve, it makes sense to also reduce the travel distance for these keys. Cushioning and actuation queuing are still provided by the compressive properties of the elastomeric key-top itself and that of its sidewalls. This has the additional beneficial effect of reducing fatigue and repetitive stress injuries.

Figure 32:
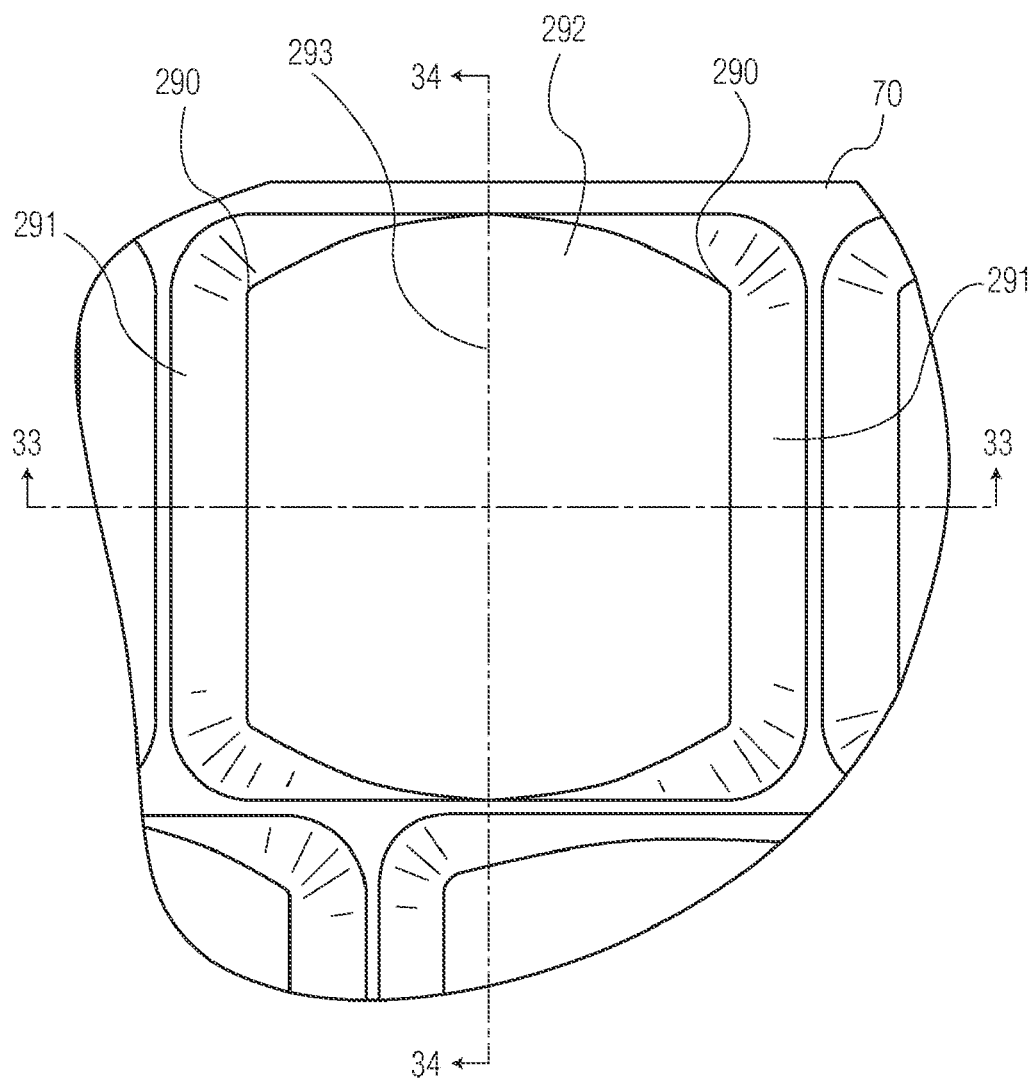
FIGS. 32-34 show a Direct key structure.
Figure 33:
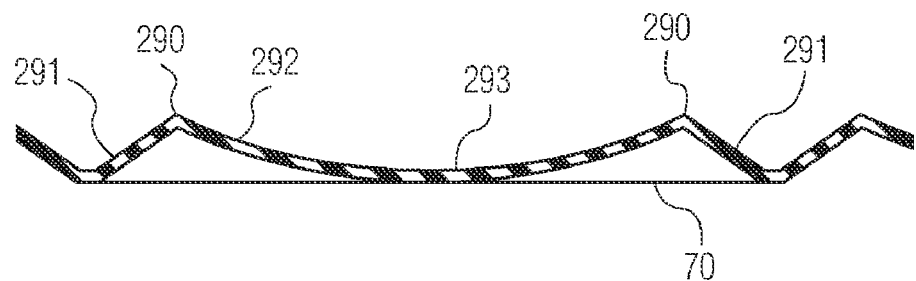
Figure 34:
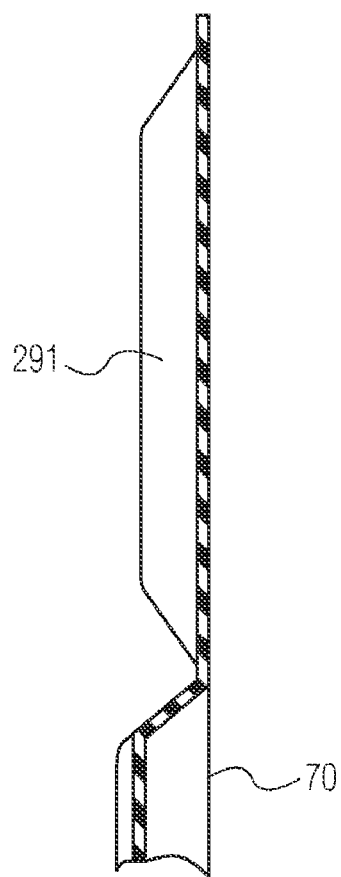

One embodiment of a key structure that follows these principals to their logical conclusion is known as a "Direct" key structure, shown in FIG. 32. This key structure has cylindrical dishing 292 and sharp edges 290 as described herein, which allow this key to be easily located tactilely. The radius of dishing is selected to gently cup the user's finger when they strike the key structure. The North, South, East and West outer sidewalls 291 are key top load bearing supports and still provide off center and shallow trajectory resistive force and deceleration. The lowest saddle edge of the cylindrical (central axis running North/South) key top 293 can rest exactly on top of the touchscreen glass 70 or just above it. Contact of the fingertip pad with this central edge leads to immediate virtual key actuation. Therefore, a vertical key stroke on this portion of a Direct key structure will actuate approximately when the user touches the keyboard overlay, thereby providing the fastest possible actuation speed while maintaining all other benefits of the keyboard overlay, including shock absorption and some spring-back.

However, when finger trajectories are significantly other than vertical or when they are vertical but enough off key center to lead to contact with an outer sidewall to key top intersecting edge, fingers will encounter subtle decelerating resistive forces as the sidewalls bend out of the way of the fingertip and the key structure flattens out. This structural and geometric design ensures that the path to actuation is of minimal distance while still allowing for finger alignment via sharp edge tactile cueing.

The space bar is a unique key—it typically has the largest plan view dimensions of any key on a keyboard. Most touch typists hover their thumbs over the space bar and then strike it vertically. However, some typists lightly rest one or both thumbs on the space bar, or inadvertently touch a thumb down on it while typing.

A characteristic of iPAD®, XOOM® and other tablet virtual keyboards is that parts of the large spacebar area are sometimes used to display several other keys when the virtual keyboard is used for entering an email address or a Web address. In other words, the virtual keyboard space bar row key layout is dynamic—changing subtly or dramatically depending on the mode and applications that are running. Furthermore, in the case of Apple's iPAD®, the space bar row is often the location of the system and application control/selection bar. A number of space bar row key configurations lend themselves to individual typing styles and usage model preferences.

One configuration involves constructing a standard (plan view) space bar as a very large, key structure with or without interior supports. This will work well for virtual keyboards whose space bar key never changes shape. If interior supports are thoughtfully distributed across the space bar key, support will be provided for typists who rest their thumbs on or who inadvertently touch the space bar to eliminate accidental actuations of the space bar.

Making the entire space bar row a flat layer of elastomeric material is an alternate configuration. This will not interfere with any dynamically changing keys displayed within the space bar region of the virtual keyboard but still provides some cushioning for the user's thumb when they strike the space bar. This also allows for space bars that change shape when moving from one typing menu to another. This configuration introduces the benefit of allowing easy access to hold-and-drag, swipe, pinch, spread or tap-able non typing system, or alternate application control commands in this typically important zone of a tablet computer. Finally, an all flat space bar row significantly improves through-overlay indicia and graphics visibility and aesthetically simplifies or cleans the overall appearance of the system while deployed.

A third alternative is to make the space bar row a flat layer of elastomeric material with two "bumps" containing full interior and outer wall support key structures. The bumps are aligned with the typical location of the user's right and left thumbs, and can be a normal key width in size. These bumps can also be aligned so as not to block alternate virtual key arrangements in the spacebar area. This approach protects against accidental actuation by thumbs while accommodating alternate key arrangements.

The return (or enter) key of traditional mechanical keyboards is large and located on the far right of the keyboard. However, virtual keyboards of the Apple iPAD®, Motorola XOOM® and other devices locate the return key in a home row rest key position under the right hand pinky finger. It is still displayed as a non-standard, over-sized key.

It is desirable for all the home row rest keys on a keyboard overlay to have identical key structures, in order to give the user a clear tactile and visual sense of where to place and rest their eight home row rest position fingers.

One solution is to put an identical home row rest key structure over the west half of the return key and put a flat sheet over the rest of the key. Another solution is to put a wide key structure over the entire return key.

Figure 35A:
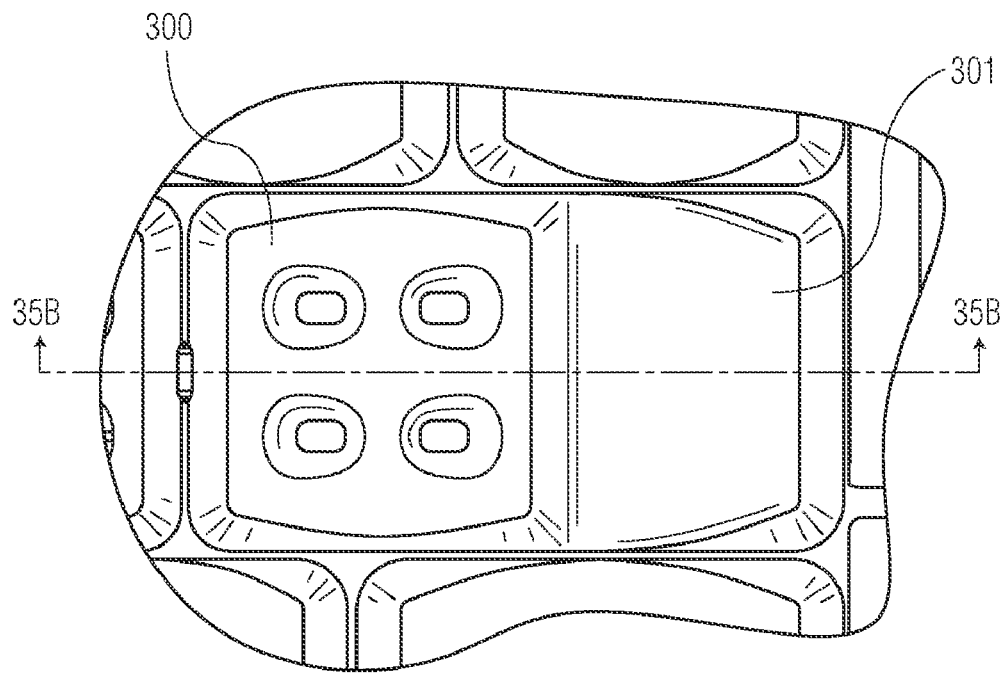
FIG. 35 shows a hybrid carriage return key structure with both home row rest and Direct key structure features.
Figure 35B:
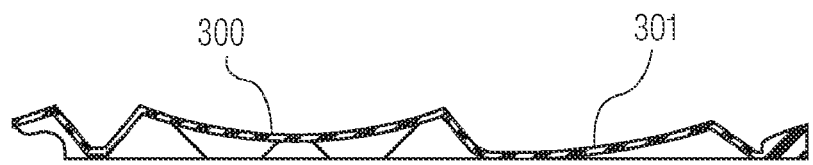

Another solution is a hybrid key that contains a home row rest key structure on the west side of the carriage return key 300 and a Direct key structure integrated into the east side 301, as illustrated in FIG. 35. This provides a uniform key structure for all the home row rest keys while at the same time providing a pleasing and appropriate visual representation of the full extent of the carriage return key. The solution also provides proper finger alignment tactile cues. Another embodiment of a hybrid carriage return key is for the West side of the key to be a standard home row rest key and for the East side of the key to be a level or slightly raised flat surface. Other return key structure embodiments are possible, including but not limited to:

An oversized return key structure whose base and key top are concentric to the plan view shape of the underlying virtual return key; this key could have uniform interior support structures evenly distributed across the key or with biasing either to the West or East or the key could have no interior supports, as pinky fingers tend to float or require less resistive rest force than other rest key fingers.

An oversized return key structure whose base and key top are concentrically aligned to the plan view shape of the underlying virtual key; the West side would have structure and geometry identical to the other standard size home row rest keys and the East side would be with or without internal supports but would be flat and at the level (measured vertically from the touch screen surface) of the West ridge to West outer sidewall intersection.

An oversized return key structure as above, but with an entirely flat key top.

An oversized return key structure as above, but with an evenly dished key top whose dish radius was greater (i.e. flatter) than that of the standard size home-row-rest-key neighbors to the West, where the East and West side intersection edges were at the same level as the neighbors and the lowest point (saddle point) of the dish is on center East West and at the same level as the saddle points of the neighbors.

Figure 36A:
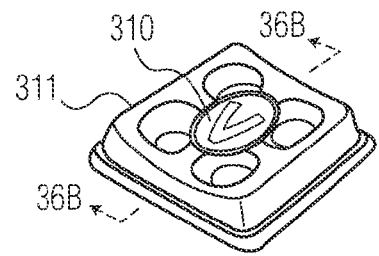
FIG. 36 shows a key structure with a built-in magnifying lens that increases visibility of the indicia of the underlying virtual keyboard.
Figure 36B:
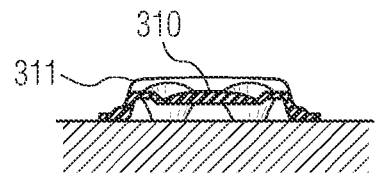

An embodiment of the present invention that uses optically clear elastomeric material such as silicone rubber provides an opportunity to increase the visibility of the indicia of the underlying virtual keyboard by including a magnifying lens 310 in the key structure, as shown in FIG. 36. The lens is fully integrated and molded into the surrounding structure 311 or is made of optically different (clearer and/or different index of refraction) material and incorporated into the key structure 311. While the lens geometry shown 310 has a spherical convex surface on top with a flat bottom, greater, distorted or different optical magnifications could also be achieved with spherical, a symmetric, concave or convex, aspherical, or other shaped bottom and/or top surfaces. Also Fresnel implementations could also effectively be incorporated into the key structure to good, effective, or aesthetically appealing end. In any envisioned case, the lens 310 overall thickness at its maximum should not exceed the finger proximity detection distance (actuation distance) as defined by the touchscreen hardware intended, to avoid introduction of overly large centered "dead zones". In the case of pressure based touchscreens, thickness would not be a consideration, allowing for more optical magnification and/or optical distortion of the underlying indicia.

Figure 37A:
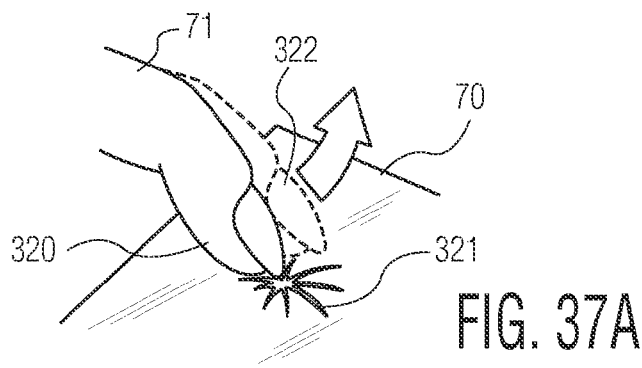
FIG. 37A shows how long fingernails can impair touch screen actuation.

People with long fingernails 321 have a difficult time typing on a proximity-based touch screen. Fingernails do not carry the proper capacitance to actuate a key even when the nail is within the proximity detection distance of the touchscreen hardware in use. Long fingernails often hit the touchscreen surface 70 and bounce off 322 before the pad of the fingertip 320 is within touch screen detection proximity as shown in FIG. 37A. This results in a missed key stroke. Also, long fingernails impacting the touch screen are noisy and uncomfortable. Since fingernails are much less compliant than fingertip pad flesh, the typing fingers incur a greater mechanical shock and tend to rebound or bounce with much greater energy off of a glass touch screen surface than when bottoming out a key that incorporates a standard mechanical non-touchscreen based key switch.

Figure 37B:
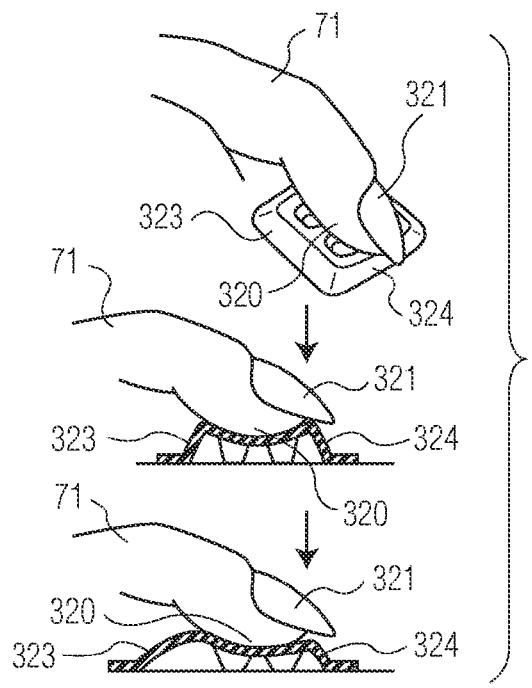
FIG. 37B shows how the key structures of the present invention allow a user with long fingernails to actuate the touch screen without their fingernails blocking actuation.
Figure 37C:
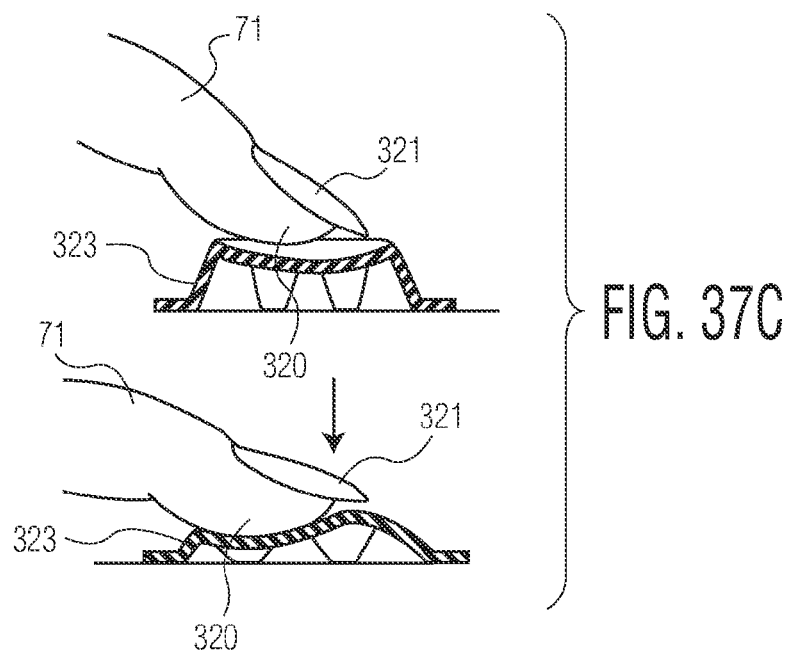
FIG. 37C shows another trajectory leading to successful touch screen actuation with long fingernails, where the key structure in the present invention acts as a pivot.

The characteristics of the key structures 323 in the present invention enable a user with long fingernails to successfully touch type. The initial resistive force in the key structure 323 allows the user to press the pad of their finger 320 onto the key 323 with their fingernail 321 extending out beyond the North edge 324. They may then depress and actuate the key without their fingernail touching the surface of the keyboard overlay, as shown in FIG. 37B. Alternatively, if the user hits a key structure with their fingernail 321 (possibly due to a shallow finger trajectory), the shock will be absorbed by the key structure 323 causing the fingertip 320 to pivot downward so that the pad lands on the key top, depressing it for effective cueing and actuation, as shown in FIG. 37C.

The key structures described herein can be arranged and combined into any number of keyboard overlay configurations. Some especially beneficial examples of complete keyboard overlays are now described. Note that there are many other possible combinations besides these.

A uniform key array contains the same key structure design in each key location, as shown in FIG. 38. This type of keyboard overlay will provide a familiar appearance to users that are used to mechanical keyboards, which also have uniform key switches.

Another variation is to use standard key structures for the home row rest key structures and Direct key structures for all other alphanumeric keys. This approach will be appealing to fast touch typists, because Direct key structures require the lowest actuation force and are lowest key travel solutions while maintaining all other benefits including shock absorption and some spring-back.

Another variation is for the home row rest key structures to be taller than the other key structures. This makes it easier for the user to tactically locate the home row keys.

Another variation optimizes around the fact that weaker fingers of the hand (typically, the pinky and ring fingers) require less initial rest support, actuation cueing and operating force. Each key in the home row rest positions could be 'tuned' using subtle changes to travel, overall height and key structure geometry to present the best force displacement performance. Direct and non-interior support non-home rest keys could also be adjusted in height and travel in this scenario. This variant makes it less likely that the user will miss keystrokes from the weaker fingers.

Another variation is to provide partial keyboard overlays. For example, a keyboard overlay that only contains key structures over the home row, or key structures only over a subset of the home row. All other keys on the virtual keyboard are not covered by a keyboard overlay. The smallest partial keyboard overlay contains only one home row rest key structure for each hand. For example, this key structure could be for the index finger of each hand, thus would be over the "F" and "J" keys of a QWERTY virtual keyboard. These minimalist keyboard overlays weigh the least, take up the least amount of space, are the least expensive to manufacture and provide the least amount of visual obstruction. They still provide a resting home row key in at least one location for each hand and thereby provide the basic home row key structure functionality.

Another variation is to provide key structures on the home row or a subset of the home row, but cover the remainder of the virtual keyboard with a flat sheet of thin elastomeric material, similar to the flat sheet space bar design. This provides basic home row key structure functionality and some amount of cushioning for the rest of the keys.

Another variation is to provide key structures on the home row or a subset of the home row, but cover the remainder of the entire tablet active screen with a flat sheet of thin elastomeric material, similar to the flat sheet space bar design. This provides basic home row key structure functionality and some amount of cushioning for the rest of the keys while protecting the entire screen surface and providing cushioning throughout, while minimizing viewing impairment anywhere on the tablet. Note that this variant could be used to provide starting finger rest positions for untraditional or dynamic virtual input control layouts and applications.

Another variation is a key structure, as in FIGS. 30A-D with a cylindrical side wall 286, for example one that is circular or oval in cross section, or one in which the side wall closes on itself without distinct corners. Such a sidewall can be of uniform thickness and internal structure, or can include varying thicknesses and internal structures as discussed herein.

Note that the other key structure variants described herein (return key variations and space bar variations) can also be applied to all keyboard overlay variations described herein. In general, a "mix and match" approach can be taken to generate other variations that would appeal to particular sets of users.

Another important consideration is the alignment, deployment, and storage of the keyboard overlay on the touch screen device. In the case of a mobile touch screen device, such as a tablet computer, the keyboard overlay should be able to be stored with the tablet computer so the keyboard overlay will not be lost and will always be easily available for use. However, the user should also be able to detach the keyboard overlay completely from the tablet computer if they wish.

The following list describes the important criteria for storing and deploying the keyboard overlay in the context of a tablet computer:

- The keyboard overlay and its storage mechanism on the tablet computer should add minimal weight to the tablet, ideally such that the user will not appreciably notice the additional weight, since one of the compelling features of a tablet computer is its substantially lower weight than other portable computing devices such as notebook computers. The preferred embodiment of a keyboard overlay and storage mechanism weighs approximately 2 ounces or less. Apple's iPAD 2® with Apple's SMART COVER® installed weighs approximately 27 ounces, so the preferred embodiment keyboard overlay increases the weight of the overall system by approximately 7%, which will cause minimal notice by a typical user,
- The keyboard overlay and its storage mechanism should not significantly increase the overall size of the tablet computer in any dimension, since one of the compelling features of a tablet computer is its substantially smaller size compared to other portable computing devices such as notebook computers. The preferred embodiment of a keyboard overlay and storage mechanism is approximately 110 mm in height (North South dimension when deployed), approximately 170 mm in width (East West dimension when deployed) and approximately 3 mm in depth for a total volume of approximately 56 cm$^3$. Apple's iPAD 2® with Apple's SMART COVER® installed and deployed is approximately 241 mm in height, approximately 186 mm in width and approximately 12 mm in depth for a total volume of approximately 538 cm$^3$. So the preferred embodiment keyboard overlay and storage mechanism increases the volume of the overall system by approximately 10%, which will cause minimal notice by a typical user, especially if the volume increase is implemented in areas that do not cause inconvenience to the user in most or all common usage scenarios—including transport. The preferred embodiment allows the keyboard to be stored fully deployed directly under the tablet computer's cover with keys compressed so that the overall thickness increase to the closed device is insignificant (less than 2.5 mm increase in thickness on a device that is currently approximately 12 mm thick, including the cover).
- The keyboard overlay and storage mechanism should allow for "instant" storage; that is, the user should not be required to perform any action significantly beyond what they normally do when they finish using their tablet computer (such as closing the cover) in order to store the keyboard overlay. The preferred embodiment keyboard overlay and storage mechanism does this, as described herein.
- The keyboard overlay and storage mechanism should allow for "instant" deployment; that is, the user should not be required to perform any action significantly beyond what they normally do when starting to use their tablet computer (such as opening the cover) in order to deploy the keyboard overlay. The preferred embodiment keyboard overlay and storage mechanism does this as described herein.
- The keyboard overlay and storage mechanism should not interfere with normal operation of the tablet computer if the user decides they do not want the keyboard overlay to be deployed when they begin using the device. It should be quick and intuitive to deploy or leave the keyboard overlay stowed when they start using the device. The preferred embodiment keyboard overlay and storage mechanism does this, as described herein.
- While the tablet computer is in use, the user will typically use the keyboard overlay at certain times and not use it at other times. For example, when editing a text document the keyboard overlay will typically be used to enter several paragraphs of text, but could then be retracted when the user moves each of those paragraphs into a different location in the document. The keyboard overlay will once again be used when the user subsequently makes modifications to some of those paragraphs. In general, the keyboard overlay must quickly and easily retract out of the way when the virtual keyboard is not being used, and must quickly and easily be extended (deployed) when the virtual keyboard is once again desired. The preferred embodiment keyboard overlay does this, as described herein.
- The keyboard overlay should be easily removable from the tablet computer if the user wishes to store it externally. The preferred embodiment keyboard overlay does this, as described herein.
- When the keyboard overlay is deployed, it should automatically align itself to be congruent with the location of the virtual keyboard on the underlying touch screen. The key structures on the keyboard overlay should be located above the keys on the virtual keyboard. The preferred embodiment keyboard overlays do this, as described herein.

A keyboard overlay's deployment system consists of:
1. A deployment perimeter that may have up to four sides. The deployment perimeter is integrated with the key array. Thus, a keyboard overlay is composed of a key array and a deployment perimeter.
2. Various other deployment components that reside on the tablet computer and/or its associated peripherals such as cases, covers, etc.

The preferred embodiment of the deployment perimeter surrounds the key array on three sides—specifically the West, South and East sides. It is also possible that the deployment perimeter could fully surround or partially surround the key array on multiple or all side surfaces of the tablet or on multiple or all side walls (wrapping down from the touch screen surface) of the tablet, depending on tablet geometry, features and desired keyboard overlay functionality and/or design aesthetics.

The deployment perimeter can be made from a wide variety of materials including elastomers, hard or flexible plastics, metal, composites or laminates including fiberglass, fiberboard, paper products, carbon fiber, etc. The deployment perimeter can even be formed by simply extending the material that the keyboard array is made from. It is possible to co-mold stiffening elements into deployment perimeter areas. The stiffening section subassemblies in the deployment perimeter can also be inserted into pockets molded into the primary material being used in the key array area; these stiffeners could also act as carriers of magnets or other alignment and fastening members of the deployment perimeter system. In the preferred embodiment, the key array elastomer material extends into the deployment perimeter zones and the injection molded stiffening members (made of engineering plastics such as HIPS, PC, ABS, PC/ABS blends, Nylon, Acetyl, Teflon, etc.) en-case the elastomer from above and below. If extra stiffness or design elegance is desired these same enclosure parts could be made with minimal geometry and fastening revisions using die-cast or machined metals such as steel or aluminum instead of engineering plastics. These parts could then be engraved for personalization and plated, anodized or finished using other decorative and protective pre and post assembly processes.

The top case parts of the deployment perimeter mate with the bottom case parts and sandwich the key array assembly between them. The deployment perimeter provides many features and functions, one of which is adhering the keyboard overlay to the tablet computer when the keyboard overlay is in use. Portions of the bottom or outside surfaces of the deployment perimeter are composed of a material or components that allow it to adhere to the glass surface of the tablet computer. The preferred embodiment does so without leaving any residue, nor requiring any special preparation of the touch screen surface, nor modifying the touch screen surface nor modifying the tablet computer in any way. Such materials or components include, separately or in combination:

- Magnets. Some tablet computers, such as the iPAD 2®, already contain magnets inside the device that are designed to attach and secure a cover, such as Apple's SMART COVER®, which contains corresponding magnets. Magnets, similar to those found in the Smart Cover are contained in the deployment perimeter, which adheres the keyboard overlay to the tablet computer. The Smart Cover magnets would then adhere to the deployment perimeter, permitting the Smart Cover to continue functioning as before.
- Micro-suction material. The surface of this material has thousands of microscopic craters that work by creating many partial vacuums between the material and the touch screen surface that hold the keyboard overlay in place. Micro-suction material is added to the bottom parts of the deployment perimeter.
- Static cling vinyl film. This material is a formulation of polyvinyl chloride (PVC) to which a large amount of liquid plasticizer has been added. It allows the perimeter to be held in place on the tablet surface via static electricity. Static cling vinyl film is added to the bottom parts of the deployment perimeter.
- Suction cups. Traditional suction cups can be formed on the bottom surface of the deployment perimeter to hold the keyboard overlay in place on the tablet surface. Suction cups are added to the bottom parts of the deployment perimeter. Alternatively, the suction cups can be integrated and molded into the main elastomer used for the key array located variously around the bottom surfaces of the deployment perimeter.
- Weak adhesives that leave no residue. Weak adhesive such as used in Post-it notes is applied to zones of the bottom surface of the bottom case parts of the deployment perimeter.
- A removable sleeve that fits onto the south end of the tablet computer that contains one or more mating mechanisms for adhering the deployment perimeter—for example, magnets, mechanical structures, hook and loop material such as Velcro, etc.
- Other components such as cantilevered snap beams or tabs oriented just outboard of the sidewalls of the tablet computer that gently align the keyboard overlay and then clip it into place against the glass surface.
- Mechanically aligning skirts or tabs that are arranged in at least three areas around the outside walls—West, East and South of the tablet computer device used instead of or in combination with the adhering materials listed herein.
- In some cases, gravity itself may be sufficient for adhesion. This property could be enhanced by purposely increasing the density and consequent weight of the perimeter area of the keyboard overlay.
- A friction tread pattern integrated into various zones of the bottom of the deployment perimeter surface or the bottom surfaces of the bottom parts could also be applied to provide sufficient stability to obviate the need for any other adhesion components.
- Other materials or components that allow the deployment perimeter to adhere to the glass surface of the tablet computer without modifying the tablet computer.

Other embodiments that use materials which do affect the surface of the tablet computer or require special preparation are also possible; for example—using a strong adhesive to permanently attach a mating mechanism for the deployment perimeter to the tablet computer.

Another approach is to build the mating or adhering mechanism directly into the tablet computer at time of manufacture. For example, magnets contained within a tablet computer as described herein, or a mechanical mating mechanism. Additional examples of this include the use of complex internal conveying mechanisms with tracks or even electromotive or stored mechanical energy deployment and retraction systems.

In the case where the keyboard overlay is an after-market accessory for existing tablet computers, the preferred embodiment of the deployment perimeter adheres to the tablet computer when a small amount of downward pressure is applied to it. This pressure can be applied by the user, in the form of a tap or press on the top parts of the deployment perimeter. Alternatively, the adherence pressure can come from magnets, as described previously.

The deployment perimeter also provides an alignment function, which aligns the keyboard overlay with the underlying touch screen and virtual keyboard. Embodiments of alignment mechanisms include the following:

- If the tablet computer contains magnets inside the device, the preferred embodiment of the deployment perimeter utilizes magnets in the deployment perimeter that are attracted to the corresponding magnets in the tablet computer. These magnets therefore align the keyboard overlay properly on the tablet computer. In this case, the dimensions of the periphery of the deployment perimeter do not matter and can either be inboard, outboard or exactly match the sidewall contours of the tablet computer, since the magnets provide alignment.
- If the tablet computer does not contain magnets, the periphery of the deployment perimeter, could approximately match the shape and dimensions of the edges of the tablet computer. This allows the user to easily visually and tactically align the keyboard overlay by lining up the edges of the deployment perimeter with the edges of the tablet computer on three sides. The deployment perimeter could also be slightly inboard or slightly outboard of the tablet computer and still achieve this effect.
- If the tablet computer is enclosed in a protective case, as shown in FIG. 49, the deployment perimeter would have a size and shape that approximately or exactly concentrically matched the inboard dimensions of the case where it overlaps the tablet computer's surface. This allows the user to easily align the keyboard overlay by aligning the edges of the deployment perimeter against or within the inboard edges of the protective case.

Another approach for a tablet computer enclosed in a protective case is for the deployment perimeter to match the inboard dimensions of the case where it overlaps the tablet computer's surface with an interior step, and also overlap the protective case. This allows the user to easily align the keyboard overlay by mechanically registering the step in the deployment perimeter against the inboard edges of the protective case. This has the added benefit of enhancing stability of the deployed overlay and possibly providing room for other deployment perimeter features. The stability increase may be enough that other adhesion components are not necessary.

The preferred embodiment of the deployment perimeter in the case of a tablet computer enclosed in a protective case is for the deployment perimeter to only overlap the protective case with an interior step on the south-east and southwest corners, and to have a tongue, that fits under the protective case in center of the south side, or other sides. The tongue provides additional surface area for the vinyl, suction cup tape, or other removable adhesive material that is on the bottom of the deployment perimeter. This allows the user to easily align the keyboard overlay by aligning the south-east and south-west corners of the deployment perimeter against the south-east and south-west inboard edges of the protective case. Note that as in the step arrangement described herein, the added adhesion of a tongue placed between the bottom surface of the protective case and the tablet perimeter surface, may obviate the need for other adhesion and alignment components.

The deployment perimeter configuration for use with a protective case can also be used for a tablet computer without a protective case. In this case, by semi-permanently adhering pads of plastic or other material to various zones of the perimeter area including but not limited to the south-west and south-east corners of the tablet computer's screen. Suction tape, vinyl, or another semipermanent adhesive solution would be used to adhere the blocks of plastic to the tablet computer screen. This allows the user to easily align the keyboard overlay by registering the south-east and south-west corners of the deployment perimeter against raised physical features in the pads. These pads could also contain magnets that were complementary to the magnets in the south-west and south-east corner of the deployment perimeter and would therefore attract the deployment perimeter when it was close to the pads. The pads could also have various mechanically locking and unlocking snap in features that interfaced with mating features in the bottom of the keyboard overlay. Any of these alternatives would help the user align the keyboard overlay and subsequently hold the keyboard overlay down when it was deployed. This is the preferred embodiment for tablet computers without a protective case.

Many other embodiments of alignment mechanisms and approaches are possible within this design approach. For example, the edges of the deployment perimeter could be inboard of the edges of the tablet computer and inboard of any protective case. In this case the user would align the keyboard overlay by visually sighting the location of the keys in the virtual keyboard and align the key structures in the keyboard overlay over these keys.

The deployment perimeter, in concert with the key array area, also provides a means for temporarily retracting the keyboard overlay from the active area of the touch screen. This accommodates the case where the user wants to frequently and to conveniently switch from using the keyboard overlay at certain times and not using it at others. The general approach for implementing these mechanisms is for the portion of the deployment perimeter to the south of the active touch screen area to remain fixed in place, while the remainder of the keyboard overlay is quickly and easily, folded, rolled or otherwise retracted to the south of the active touch screen area. Ideally, it is a very quick and intuitive operation for the user to retract the keyboard overlay when they temporarily don't want to use it, and then to extend it back to its operating position when they want to use it again. While the keyboard is temporarily retracted, it should occupy little space and not encumber the desired functionality or comfort of the tablet in any envisioned orientations and locations. Embodiments of retraction and extension mechanisms include the following:

The movable portion of the keyboard overlay rolls up or fan-folds into the retracted position. Strategically placed fold lines and hinge webs are incorporated into the deployment perimeter and the key array to enable the user to retract the keyboard overlay using rolling or folding. Note that this operation is facilitated by the choice of an elastomeric material in the preferred embodiment of the key array. Essentially the hinge/fold areas of the perimeter are molded right into the key array, taking advantage of the elastic properties of the material and the folds are directed by the strategic placement of the stiffening members of the deployment perimeter assembly. When the keyboard overlay is in its fully retracted position, magnets or mechanical means such as hooks or snaps could be used to temporarily secure the keyboard overlay in the retracted position if necessary. To accommodate this, magnets and or mechanical fasteners are strategically placed in the deployment perimeter. Additional magnets or mechanical fasteners could also reside in the middle of the east and west portions of the deployment perimeter.

Another approach for a retraction mechanism is to divide the movable portion of the keyboard overlay into sections, which can slide over each other in order to retract. When fully retracted, the sections would be overlapped on the south portion of the deployment perimeter.

A hinge, either mechanical or constructed directly using the material that makes up the deployment perimeter, connects the fixed portion and the moveable portion of the keyboard overlay immediately to the south of the active touch screen area. The moveable portion of the keyboard overlay would be retracted by swinging it around this hinge or a series of hinges.

Many other embodiments of temporary retraction and extension of a portion of the keyboard overlay are possible. For example, the keyboard overlay could simply be removed completely from the tablet computer and placed aside when the user did not want to use it, and then reattached when the user wanted to use it again. Or the entire assembly could be pivoted from the south west or southeast corners of the tablet and swung out of the way (about an axis that is approximately vertical to the tablet touch screen surface).

The deployment perimeter also provides a means for storage of the keyboard overlay with the tablet computer. Various embodiments offer "instant" storage and deployment as described herein, and they are as follows:

If the tablet computer contains magnets in the south portion of the tablet, such as Apple's iPAD 2®, and has a cover that contains matching magnets, such as Apple's SMART COVER®, then the keyboard overlay can be stored in the cover. The magnetic alignment mechanism described previously is used to adhere the south end of the keyboard overlay to the cover, since the magnets in the keyboard overlay will be attracted to the corresponding magnets in the cover. The magnets or mechanical fasteners described in the roll up/fan-fold retraction mechanism are used to adhere the north end of the keyboard overlay to the cover in a similar fashion. Note that covers which do not have corresponding magnets or mechanical fasteners in these locations will need to be fitted with them. One embodiment is to use a semi-permanent adhesive to stick the corresponding magnets or mechanical fasteners to the cover. The preferred embodiment is composed of two magnets fixed into a flexible assembly. This assembly wraps around the outside edges of the cover and is held in place by magnetic attraction. This allows for easy non-permanent placement and easy adjustability. Finally, a small tab ideally envisioned running partially, periodically or entirely across the south end of the deployment perimeter allows the user to easily choose whether the keyboard overlay should stay with the cover when the cover is opened or be deployed onto the tablet surface, as shown in FIG. 55. Holding down the tab or pressing down on the south edge of the cover to adhere the deployment perimeter to the tablet will deploy the keyboard overlay. Simply opening the cover will keep the keyboard overlay stored in the cover. Note that this storage option is viable even if the tablet computer does not contain magnets. The user may add more fitting assemblies described herein to substitute for any fasteners or magnets normally found in the cover or tablet. If the cover is rolled up to form an angled brace for the tablet computer, the keyboard overlay stored in the cover will simply roll up with it. This solution results in minimal volume added to the tablet computer and cover and allows complete usage of the tablet cover in all configurations envisioned by the original manufacturer as if a keyboard overlay was not present.

Another approach is to detach the keyboard overlay when it is in its retracted position and store it inside or outside the cover of the tablet computer. The keyboard overlay takes up the minimum amount of planar space in this configuration, although it is substantially thicker in depth than when fully extended. This approach is preferred in some situations, such as when the cover doesn't roll up and there is a significant air gap between the cover and the tablet when the cover is closed over the tablet surface.

Many other embodiments of storage of the keyboard overlay are possible. For example, the keyboard overlay could be rolled under the south end of the tablet computer and then stored on the back of the tablet. A storage pouch or pocket could be integrated into a tablet's protective case. Furthermore, case that encompassed the entire tablet could be devised made of an elastomeric material with keyboard array flap integrated that could be deployed and retracted as described herein and then flipped 180 degrees to the back side for mechanical stowage. Original manufacturer solutions could include solutions where the keyboard assembly is mechanically retracted to the back underside of the tablet within the tablet itself, thus integrating the storage function into the tablet enclosure.

While the preferred embodiment of the invention has been illustrated and described, as noted above, many changes can be made without departing from the spirit and scope of the invention. For example, the present invention will work with a digital resistive touch screen and other known touch screens. In another example, many aspects of the present invention will provide benefits to "hunt and peck" typists as well as touch typists. Pre-actuation cueing, deceleration, spring-back and cushioning all make for a much better "hunt and peck" typing experience. The present invention can be thought of as providing a superset of benefits to all typists, and then additional benefits to specific subgroups. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A touch screen keyboard overlay comprising:
   eight home row rest key structures of compressible elastomeric material, the home row rest key structures including two forefinger home row rest key structures, each home row rest key structure having a finger surface with a top and a bottom, an outer sidewall and an interior support;
   the outer sidewall taller than the actuation distance of a touch screen;
   the finger surface, outer sidewall, and interior support of each home row rest key structure sufficiently resistive of the resting weight of a finger that the finger surface top remains further than the actuation distance under resting pressure;
   the finger surface, outer sidewall, and interior support of each home row rest key structure collapsible under pressure so that the finger surface top is within an actuation distance of a touch screen under an actuation pressure;
   the finger surface, outer sidewall, and interior support of each home row rest key structure providing increasing resistance to compression during collapse prior to the finger surface top being within the actuation distance;
   the finger surface, outer sidewall, and interior support of each home row rest key structure springing back upon release of actuation pressure;
   the home row rest key structures positionable over the home row rest keys of a touch screen keyboard.

2. The keyboard overlay of claim 1 wherein the resistive pressure of the finger surface, outer sidewall, and interior support of each home row rest key structure varies during collapse under actuation pressure to provide a tactile pre-actuation cue when depressed.

3. The keyboard overlay of claim 1 wherein the home row rest key structures include tactile finger position cues.

4. The keyboard overlay of claim 1 wherein the forefinger home row rest key structures include tactile identification cues.

5. The keyboard overlay of claim 1, further comprising an additional key structure of compressible elastomeric material,
   the additional key structure having a finger surface with a top and a bottom and an outer sidewall,
   the outer sidewall taller than the actuation distance of a touch screen,
   the finger surface and outer sidewall of the additional key structure collapsible under pressure so that the finger surface top is within an actuation distance of a touch screen under an actuation pressure, the additional key structure positionable over an additional key of a touch screen keyboard.

6. The keyboard overlay of claim 5 wherein the finger surface and outer sidewall of the additional key structure provide increasing resistance to compression during collapse.

7. The keyboard overlay of claim 5 wherein the finger surface and outer sidewall of the additional key structure spring back upon release of actuation pressure.

8. The keyboard overlay of claim 1 wherein one home row rest key structure is a return key structure.

9. The keyboard overlay of claim 8 wherein a portion of the return key structure includes tactile finger position cues.

10. The keyboard overlay of claim 8 wherein a portion of the return key structure excludes tactile position cues.

11. A touch screen keyboard overlay comprising:
two home row rest key structures of compressible elastomeric material, each home row rest key structure having a finger surface with a top and a bottom, an outer sidewall and an interior support;
the outer sidewall taller than the actuation distance of a touch screen;
the finger surface, outer sidewall, and interior support of each home row rest key structure sufficiently resistive of the resting weight of a finger that the finger surface top remains further than the actuation distance under resting pressure;
the finger surface, outer sidewall, and interior support of each home row rest key structure collapsible under pressure so that the finger surface top is within an actuation distance of a touch screen under an actuation pressure;
the finger surface, outer sidewall, and interior support of each home row rest key structure providing increasing resistance to compression during collapse prior to the finger surface top being within the actuation distance;
the finger surface, outer sidewall, and interior support of each home row rest key structure springing back upon release of actuation pressure;
the home row rest key structures positionable over the home row rest keys of a touch screen keyboard.

12. The keyboard overlay of claim 11 wherein the two home row rest key structures are forefinger home row rest key structures.

13. The keyboard overlay of claim 12 wherein the forefinger home row rest key structures include tactile position cues.

14. The keyboard overlay of claim 11 further comprising one additional key structure of compressible elastomeric material,
the additional key structure having a finger surface with a top and a bottom and an outer sidewall,
the outer sidewall taller than the actuation distance of a touch screen,
the finger surface and outer sidewall of the additional key structure collapsible under pressure so that the finger surface top is within an actuation distance of a touch screen under an actuation pressure,
the additional key structure positionable over an additional key of a touch screen keyboard.

15. The keyboard overlay of claim 11 wherein the resistive pressure of the finger surface, outer sidewall, and interior support of each home row rest key structure varies during collapse under actuation pressure to provide a tactile pre-actuation cue when depressed.

16. A key structure comprised of compressible elastomeric material having a finger surface with a top and a bottom, an outer sidewall and an interior support;
the outer sidewall taller than the actuation distance of a touch screen;
the finger surface, outer sidewall, and interior support of the key structure collapsible under pressure so that the finger surface top is within an actuation distance of a touch screen under an actuation pressure;
the finger surface, outer sidewall, and interior support of the key structure providing increasing resistance to compression during collapse prior to the finger surface top being within the actuation distance;
the finger surface, outer sidewall, and interior support of the key structure springing back upon release of actuation pressure;
the key structure positionable over a key of a touch screen keyboard.

17. The key structure of claim 16 including tactile finger position cues.

18. The key structure of claim 16 including tactile identification cues.

19. The key structure of claim 16 wherein the outer sidewall is cylindrical.

20. The key structure of claim 16 wherein the outer sidewall is closed on itself.

21. The key structure of claim 16 wherein the resistive pressure of the finger surface, outer sidewall, and interior support of the key structure varies during collapse under actuation pressure to provide a tactile pre-actuation cue when depressed.

22. The keyboard overlay of claim 11 further comprising a deployment perimeter, the deployment perimeter extending outwards from the keyboard overlay key structures in at least one direction, the deployment perimeter attachable to a surface of a touch screen enabled device.

23. The keyboard overlay of claim 22 wherein the deployment perimeter further comprises at least one magnet alignable with a magnetic field of a touch screen enabled device to maintain the home row rest key structures over the home row rest keys of the touch screen keyboard.

24. The keyboard overlay of claim 22 wherein the deployment perimeter further comprises microsuction material.

25. The keyboard overlay of claim 22 wherein the deployment perimeter further comprises static cling film.

26. The keyboard overlay of claim 22 wherein the deployment perimeter further comprises suction cups.

27. The keyboard overlay of claim 22 wherein the deployment perimeter further comprises adhesive material.

28. The keyboard overlay of claim 22 wherein the deployment perimeter further comprises a sleeve sized to fit over a side of the touch screen enabled device.

29. The keyboard overlay of claim 22 wherein the deployment perimeter extends outwards from the keyboard overlay key structures in at least one additional direction.

30. The keyboard overlay of claim 22 wherein the deployment perimeter further comprises a clip sized to fit over a side of the touch screen enabled device.

31. A key structure comprised of compressible elastomeric material having a finger surface with a top and a bottom, an outer sidewall and an interior support;

the interior support taller than the actuation distance of a touch screen;

the finger surface, outer sidewall, and interior support of the key structure collapsible under pressure so that the finger surface top is within an actuation distance of a touch screen under an actuation pressure;

the finger surface, outer sidewall, and interior support of the key structure providing increasing resistance to compression during collapse prior to the finger surface top being within the actuation distance;

the finger surface, outer sidewall, and interior support of the key structure springing back upon release of actuation pressure;

the key structure positionable over a key of a touch screen keyboard.

* * * * *